(12) United States Patent
Fukuhara et al.

(10) Patent No.: US 6,381,275 B1
(45) Date of Patent: *Apr. 30, 2002

(54) IMAGE CODING APPARATUS AND IMAGE DECODING APPARATUS

(75) Inventors: Takahiro Fukuhara; Shunichi Sekiguchi; Kohtaro Asai; Tokumichi Murakami, all of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/759,834

(22) Filed: Dec. 4, 1996

(30) Foreign Application Priority Data

Jun. 28, 1996 (JP) .............................. 8-169489

(51) Int. Cl.[7] ................................. H04N 7/18
(52) U.S. Cl. .............................. 375/240.06; 375/240.14
(58) Field of Search ................ 348/407, 402, 348/409, 411–416, 699; 375/240.06, 240.14; H04N 7/12, 7/18

(56) References Cited

U.S. PATENT DOCUMENTS

| 4,591,909 A | * | 5/1986 | Kuroda et al. ............. 348/415 |
| 4,689,671 A | * | 8/1987 | Ohki et al. ................. 348/416 |
| 4,833,535 A | | 5/1989 | Ozeki et al. |
| 5,367,629 A | * | 11/1994 | Chu et al. .................. 348/400 |
| 5,436,666 A | | 7/1995 | Astle |
| 5,592,228 A | * | 1/1997 | Dachiku et al. ............ 348/416 |

FOREIGN PATENT DOCUMENTS

EP 0658053 A1 6/1995

OTHER PUBLICATIONS

Kohtaro Asai et al., Core Experiments of Video coding with Block–Partitioning and Adaptive Selection of Two Frame Memories (STFM/LTFM), ISO/IEC JTC1/SC29/WG11, Jan. 1996, Munich.

"Moving Picture Information Engineering and Broadcasting Technology", pp. 29–60, Apr. 1995, Japan Television Society.

Information Technology–Generic Coding of Moving Pictures and Associated Audio Information: Video, Recommendation ITU–t H. 262, ISO/IEC 13818–2, Draft International Standard, International Organization for Standarisation, Nov. 9, 1994.

* cited by examiner

Primary Examiner—Young Lee

(57) ABSTRACT

An image coding apparatus which includes a frame memory selecting unit (35) for selecting, in response to a selection signal, an image to be continuously stored in a plurality of frame memories (9, 10) as a background image and storing the background image into the plurality of frame memories (9, 10), and a background motion compensating unit (14, 39) for performing motion compensating prediction corresponding to an input image based on the background image to generate a predicted image based on the motion compensating prediction, and an image decoding apparatus corresponding to the image coding apparatus.

20 Claims, 33 Drawing Sheets

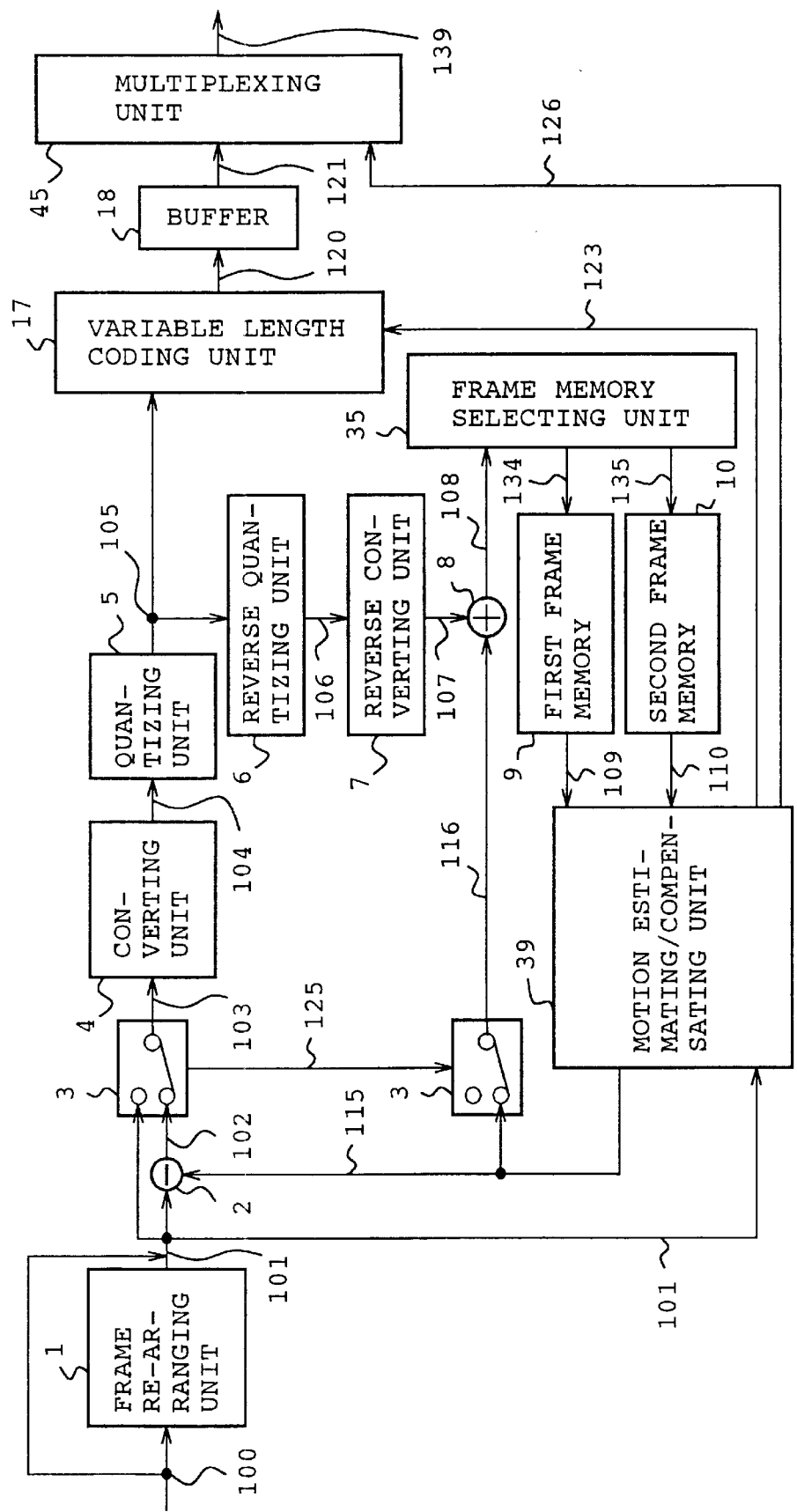

"PG": P AND BG MC
"BG": BACKGROUND

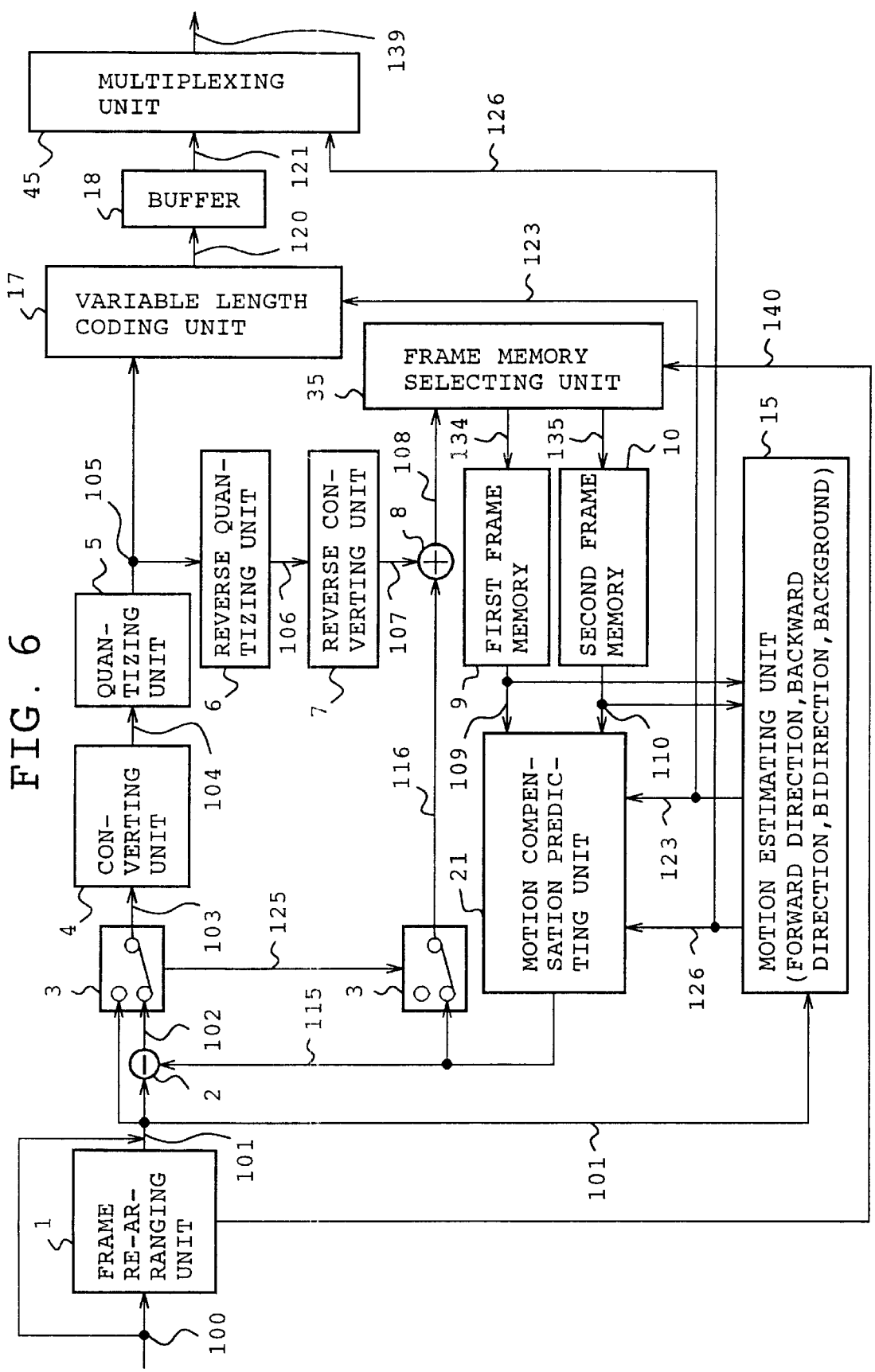

FIG. 17A

|  | MV3(1) |
|---|---|
| MV2(1) | MV(1) |
|  | MV1(1) |

REFERENCE MOTION VECTOR
FOR FIRST MEMORY

FIG. 17B

|  | MV3(2) |
|---|---|
| MV2(2) | MV(2) |
|  | MV1(2) |

REFERENCE MOTION VECTOR
FOR SECOND MEMORY

I B B P B B P B B I

IMAGE CODING APPARATUS AND IMAGE DECODING APPARATUS

BACKGROUND OF THE INVENTION

1. Field of the Invention

This invention relates to an image coding apparatus and an image decoding apparatus for use with a system which performs high efficiency coding or decoding of moving pictures to perform efficient transmission or storage of images, and more particularly to an image coding apparatus and an image decoding apparatus which can be applied to processing of, for example, a digital broadcasting system which is performed using a satellite or a ground wave or cable communication network, a digital video disk, a mobile video phone, a PHS video phone or a data base for images.

2. Description of the Prior Art

As a representative one of conventional high efficiency coding systems, the MPEG2 is known which is an international standard system recommended by the ISO/IEC/JTC1/SC29/WG11. For example, "Image Information Engineering and Broadcasting Techniques", Journal of the Television Engineering Society of Japan, April, 1995 explains the MPEG as a theme of special editing. A coding system of the MPEG2 is disclosed in "3-2 Video Compression" of the same document, pp. 29–60.

The coding system of the MPEG2 is described below.

FIG. 31 is a block diagram showing a basic construction of an ordinary encoder of the MPEG2, and FIG. 32 is a block diagram showing a basic construction of an MPEG2 decoder. Referring to FIGS. 31 and 32, reference numeral 1 denotes a frame re-arranging unit, 2 a subtracting unit, reference characters 3a and 3b denote each an inter (interframe)/intra(intraframe) switching selector, reference numeral 4 denotes a converting unit, 5 a quantizing unit, 6 a reverse quantizing unit, 7 a reverse converting unit, 8 an adder, 9 a first frame memory, 10 a second frame memory, 11 a forward direction motion compensating unit, 12 a bidirection motion compensating unit, 13 a backward direction motion compensating unit, 151 a motion estimating unit, 16 a coding control unit, 17 a variable length coding unit, and 18 a buffer.

Further, reference numeral 100 denotes input image data in the form of digital data, 101 re-arranged input image data, 102 a predictive error image, 103 an original input image or predictive error image, 104 a conversion coefficient, 105 a quantization coefficient, 106 a reverse quantized conversion coefficient, 107 reversed converted image data, 108 a locally decoded image, 109 a reference image from the first frame memory, 110 a reference image from the second frame memory, 111 a forward direction motion predicted image, 112 a bidirection motion predicted image, 113 a backward direction motion predicted image, 115 a determined predicted image, 117 a control signal to the selector, 118 a control signal to the converting unit 4, 119 an adaptive quantization value, 120 a variable length coder, 121 a bit stream, 123 a motion vector, 124 a reference image, and 125 an intra/inter switching signal.

Operation of the conventional image encoder is described below with reference to FIG. 31.

First, an input image signal 100 in the form of a digital signal is inputted to the frame re-arranging unit 1, by which picture frames to be coded are re-arranged.

FIG. 33 illustrates such re-arrangement. Referring to FIG. 33, reference character I denotes an intra (intraframe) coded picture, P an interframe coded picture, and B a bidirectional predictive coded picture. It is to be noted that reference numerals 1 to 10 represent an order in time in which they are displayed.

The first frame is first coded as an I picture, and then the fourth frame is coded as a P picture, whereupon the already coded I picture is used as a reference frame for prediction.

Then, the second frame is coded as a B picture. Thereupon, the I picture of the first frame and the P picture of the fourth frame coded already are used as reference frames for the prediction. In FIG. 33, each arrow mark represents a direction in which prediction is performed.

Thereafter, coding is performed in the construction of I, B, B, P, B, B, P, . . . by similar processing. Accordingly, the action of the frame re-arranging unit 1 is to re-arrange the input image signal 100, in which the picture frames are arranged in order of time, so that they appear in order of coding in order to allow the processing described above.

Subsequently, since predictive coding is not performed for the I picture mentioned above, when the re-arranged image 101 is inputted as it is to the selector 3a, it is transmitted as a selector output 103 to the converting unit 4. On the other hand, for predictive coding for the P picture or the B picture mentioned above, the re-arranged image 101 is subtracted from a predicted image 115 by the subtracting unit 2, and a predictive error image 102 is transmitted as the selector output 103 to the converting unit 4.

Then, the selector output 103 is inputted to the converting unit 4, and a conversion coefficient 104 is outputted from the converting unit 4. The conversion coefficient 104 passes the quantizing unit 5, and a quantization coefficient 105 is obtained from the quantizing unit 5. The quantization coefficient 105 is coded into a variable length code by the variable length coding unit 17, and a variable length coded word 120 is outputted from the variable length coding unit 17.

The quantization coefficient 105 is, on the other hand, inputted to the reverse quantizing unit 6, and a quantization coefficient 106 is outputted from the reverse quantizing unit 6.

Further, the quantization coefficient 106 is reverse converted back to an image level by the reverse converting unit 7, and image data 107 is outputted from the reverse converting unit 7. The image data 107 is, where it is data of the I picture, added to a predicted image 116 selected by the adding unit 8, and a locally decoded image 108 is outputted from the adding unit 8.

It is to be noted that the locally decoded image 108 is written as it is into the first frame memory 9 when it is an I picture, but, when it is a P picture, it is written into the second frame memory 10.

On the other hand, when the locally decoded image 108 is a B picture, it is written into neither the first frame memory 9 nor the second frame memory 10.

Thereafter, when the locally decoded image 108 is a P picture, since it is used only for forward direction prediction, a reference image 124 in the first frame memory 9 is read out, and motion prediction is performed for each macroblock (basic unit for processing of 16 pixels×16 lines) by the motion estimating unit 151. The motion estimating unit 151 thus selects one of the macroblocks which has a value nearest to that of the current macroblock as a predicted image, and simultaneously outputs a motion vector 123 therefrom.

The motion vector 123 is inputted to the motion compensating units 11, 12 and 13 surrounded by a dotted line in FIG.

31, and motion predictive pictures are outputted from the motion compensating units 11, 12 and 13.

In this instance, the forward direction motion compensating unit 11 produces a forward direction motion predicted image 111 using a reference image 109 from the first frame memory 9 and outputs a thus determined predicted image 115.

Further, as described hereinabove, the locally decoded images 108 of all macroblocks in a P picture are written into the second frame memory. However, even with the P picture mentioned above, when the macroblocks thereof are intraframe (intra) coded, the frame re-arranged image 101 is outputted directly as the selector output.

Meanwhile, for a B picture, the procedure of coding processing is similar to that for a P picture described above, but different from the processing for a P picture, in that two reference frames are used for prediction.

The motion estimating unit 151 performs forward direction prediction using the reference image 109 from the first frame memory 9, backward direction prediction using a reference image 110 from the second frame memory 10, and bidirection prediction using both of the reference images 109 and 110 to select one of the prediction modes with which a value nearest to that of the current macroblock is obtained, and then outputs a motion vector 123.

In accordance with the thus determined prediction mode, in the motion compensating unit, one of the motion compensating units 11, 12 and 13 which corresponds to the determined prediction mode produces and outputs a predicted picture.

For example, when bidirection motion prediction is selected, the bidirection motion compensating unit 12 produces and outputs a predicted image 115 determined using a bidirection predicted image 112.

After coding of the B pictures of the second and third frames shown in FIG. 33 is completed, image data written in the second frame memory is transferred to the first frame memory. Thereafter, the P picture of the seventh frame is coded, and a decoded picture is written into the second frame memory.

Thereafter, B pictures (fifth and sixth frames) are coded by similar processing to that described above.

When the macroblocks are intraframe (intra) coded, the image 101 after frame re-arrangement is directly outputted as the selector output similarly as in the case of a P picture.

FIG. 32 is a block diagram of a conventional decoder. Referring to FIG. 32, reference character 22 denotes a variable length decoding unit, 107(a) an intra (intraframe) coded picture, and 107(b) a prediction error picture.

Subsequently, operation of the conventional decoder will be described.

A bit stream 121 is stored for a certain period of time into the receiving buffer 18, and a variable length coded word 120 is variable length decoded by the variable length decoding unit 22 and outputted as a quantization coefficient 105.

The processing procedure after this is quite similar to the local decoding processing of the encoder described hereinabove.

When the macroblock is intra decoded, a reverse converted image 107 makes an image 107(a) without passing the adding unit 8, but when the macroblock is inter (interframe) decoded, the reverse converted image data 107 makes an image 107(b). The image 107(b) is added to a predicted image 115 by the adding unit 8, and a decoded image 108 is outputted from the adding unit 8. The decoded image 108 is processed by the displayed frame re-arranging unit 38 such that such decoded images are re-arranged so that they appear in order of time, and finally, an output image 137 is outputted the displayed frame re-arranging unit 38.

The example of a conventional image coder and image decoder described above is a representative apparatus of a type which performs forward direction, bidirection and backward direction prediction coding in combination.

In the example, for coding of a P picture, only forward direction prediction is performed using the first frame memory to perform predictive coding. On the other hand, for coding of a B picture, one of the modes of forward direction prediction, backward direction prediction and bidirection prediction with which a minimum predictive error is provided is selected using the first and second frame memories.

Accordingly, as coding processing proceeds, decoded pictures written in the frame memories are erased. Consequently, for example, even if one of coded pictures processed in the past is similar to a picture of the currently coded frame, since the past decoded pictures have already been erased from the frame memories, the similar coded picture cannot be used for reference, resulting in a problem of lower image processing efficiency.

SUMMARY OF THE INVENTION

It is an object of the present invention to provide, in order to solve the problems of the conventional image encoder and image decoder described above, an image coding apparatus and an image decoding apparatus wherein a decoded image obtained in the past can be utilized efficiently as a reference picture and the overall prediction efficiency is improved to achieve moving picture coding and decoding of a high efficiency.

According to an aspect of the present invention, there is provided an image coding apparatus, comprising storage means for storing a plurality of decoded images, motion compensating prediction means for performing motion compensating prediction corresponding to an input image based on the plurality of decoded images stored in the storage means to produce a motion vector and for generating a predicted image based on the motion compensating prediction, prediction error calculation means for calculating a difference between the predicted image generated by the motion compensating prediction means and the input image to calculate a prediction error image, decoding means for generating the decoded images from the prediction error image calculated by the prediction error calculation means and the predicted image, background image storage control means for selecting one of the decoded images which is to be continuously stored in the storage means as a background image and storing the background image into the storage means, and background motion compensation means for performing motion compensating prediction corresponding to the input image based on the background image to generate a motion vector and generating a predicted image based on the motion compensating prediction.

According to another aspect of the present invention, there is provided an image decoding apparatus, comprising storage means for storing a plurality of decoded images, motion compensation means for performing motion compensating prediction based on the decoded images stored in the storage means to generate a motion compensated image, decoding means for generating the coded images from the motion compensated image from the motion compensation means and a prediction error image, background image storage control means for selecting one of the decoded images which is to be continuously stored in the storage means as a background image and storing the background image into the storage means, and background predicted image generation means for generating a background predicted image based on the background image.

The image coding apparatus and the image decoding apparatus of the present invention may be constructed such that the storage means includes a frame memory for storing a decoded image, and another frame memory for storing the background image.

The image coding apparatus and the image decoding apparatus of the present invention may otherwise be constructed such that re-writing of image contents into the storage means by the background image storage control means is performed in units of a picture after a predetermined interval of time or in response to a control signal from the outside.

The image coding apparatus and the image decoding apparatus of the present invention may otherwise be constructed such that re-writing of image contents into the storage means by the background image storage control means is performed in units of a macroblock after a predetermined interval of time or in response to a control signal from the outside.

The image coding apparatus of the present invention may otherwise be constructed such that the background motion compensation means has a variable searching range for a motion vector from the background images.

The image coding apparatus of the present invention may otherwise be constructed such that it further comprises differential vector generation means for holding a motion vector obtained from the motion compensating prediction means or the background motion compensation means and calculating a difference vector between the generated motion vector and the motion vector in the past, and the difference vector is variable length coded.

The image decoding apparatus of the present invention may otherwise be constructed such that it further comprises a motion vector adding unit for holding a motion vector decoded in the past and adding the motion vector decoded in the past to a difference vector to regenerate a motion vector.

According to a further aspect of the present invention, there is provided an image decoding apparatus which outputs a coded bit stream of moving pictures, comprising a plurality of frame memory groups for storing, individually for a plurality of objects which compose a screen, decoded images of the objects in the past, a frame memory selecting unit for selecting, in response to a control signal, into a frame memory of which one of the plurality of frame memory groups a decoded image is to be written, a motion compensation predicting unit for selecting one of forward direction prediction, backward direction prediction, bidirection prediction and background prediction in units of an object using reference images read out from frame memories of the plurality of frame memory groups provided for the individual objects to perform motion compensating prediction, a subtractor for calculating a difference between the predicted image and a current image to calculate a prediction error image, an adding unit for adding the predicted image from the reference images and the prediction error image of the current image, and a variable length coding unit for variable length coding information.

According to a still further aspect of the present invention, there is provided an image decoding apparatus which decodes a coded bit stream of moving pictures, comprising a plurality of frame memory groups for storing, individually for a plurality of objects which construct a screen, decoded images of the objects, a frame memory selecting unit for selecting, in response to a control signal, into a frame memory of which one of the plurality of frame memory groups the coded images are to be written for the individual objects, a variable length decoding unit for variable length decoding the coded bit stream, and a motion compensating unit for selecting one of forward direction prediction, backward direction prediction, bidirection prediction and background prediction in units of an object using reference images read out from frame memories of the plurality of frame memory groups to generate a motion compensated image.

The image coding apparatus or the image decoding apparatus of the present invention may be constructed such that the plurality of frame memory groups include three frame memory groups.

The image coding apparatus of the present invention may otherwise be constructed such that re-writing of image contents of a region in which an object which is a subject of coding is included in the plurality of frame memory groups in which coded images of the object in the past are stored is performed after a certain interval of time or in response to a control signal from the outside.

The image decoding apparatus of the present invention may otherwise be constructed such that re-writing of image contents of a region in which an object which is a subject of decoding is included in the plurality of frame memory groups in which coded images of the object in the past are stored is performed after a certain interval of time or in response to a control signal from the outside.

The image coding apparatus of the present invention may otherwise be constructed such that searching ranges for a motion vector from reference images from the plurality of frame memory groups for the individual objects are variable for the individual objects.

The image coding apparatus of the present invention may otherwise be constructed such that it further comprises differential vector generation means for holding a motion vector in the past obtained by referring to images from the plurality of frame memory groups for the individual objects and calculating difference vectors separately for the individual objects, and the difference vectors are variable length coded.

The image decoding apparatus of the present invention may otherwise be constructed such that it further comprises a motion vector adding unit for holding decoded motion vectors in the past obtained by referring to images in the plurality of frame memory groups for the individual objects for a certain period of time and adding the motion vectors decoded in the past to the decoded difference vectors to regenerate motion vectors for the individual objects.

BRIEF DESCRIPTION OF THE DRAWINGS

The present invention will become more fully understood accompanying drawings which are given by way of illustration only, and thus are not limitative of the present invention, and wherein:

FIG. 4 is a block diagram showing another construction of the coding apparatus for moving pictures according to the embodiment 1 of the present invention;

FIG. 6 is a block diagram showing a further construction of the coding apparatus for moving pictures according to the embodiment 1 of the present invention;

FIGS. 17A and 17B are diagrammatic views illustrating a coding method of a motion vector in the embodiment 8 of the present invention;

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

In the following, image coding apparatus and image decoding apparatus of preferred embodiments of the present invention will be described with reference to the accompanying drawings.

Embodiment 1

Figure 1:
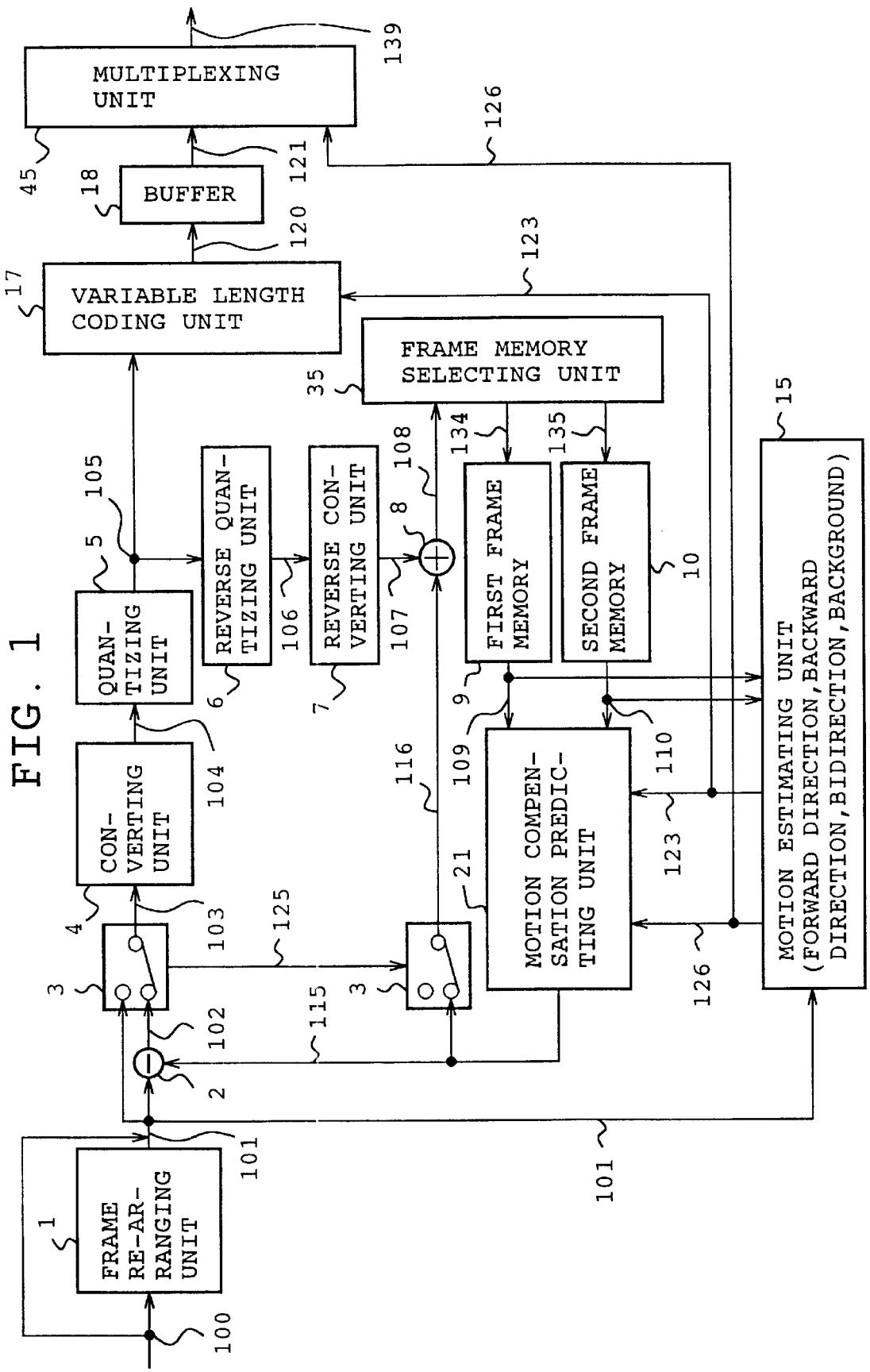
FIG. 1 is a block diagram of a coding apparatus for moving pictures according to an embodiment 1 of the present invention.
Figure 31:
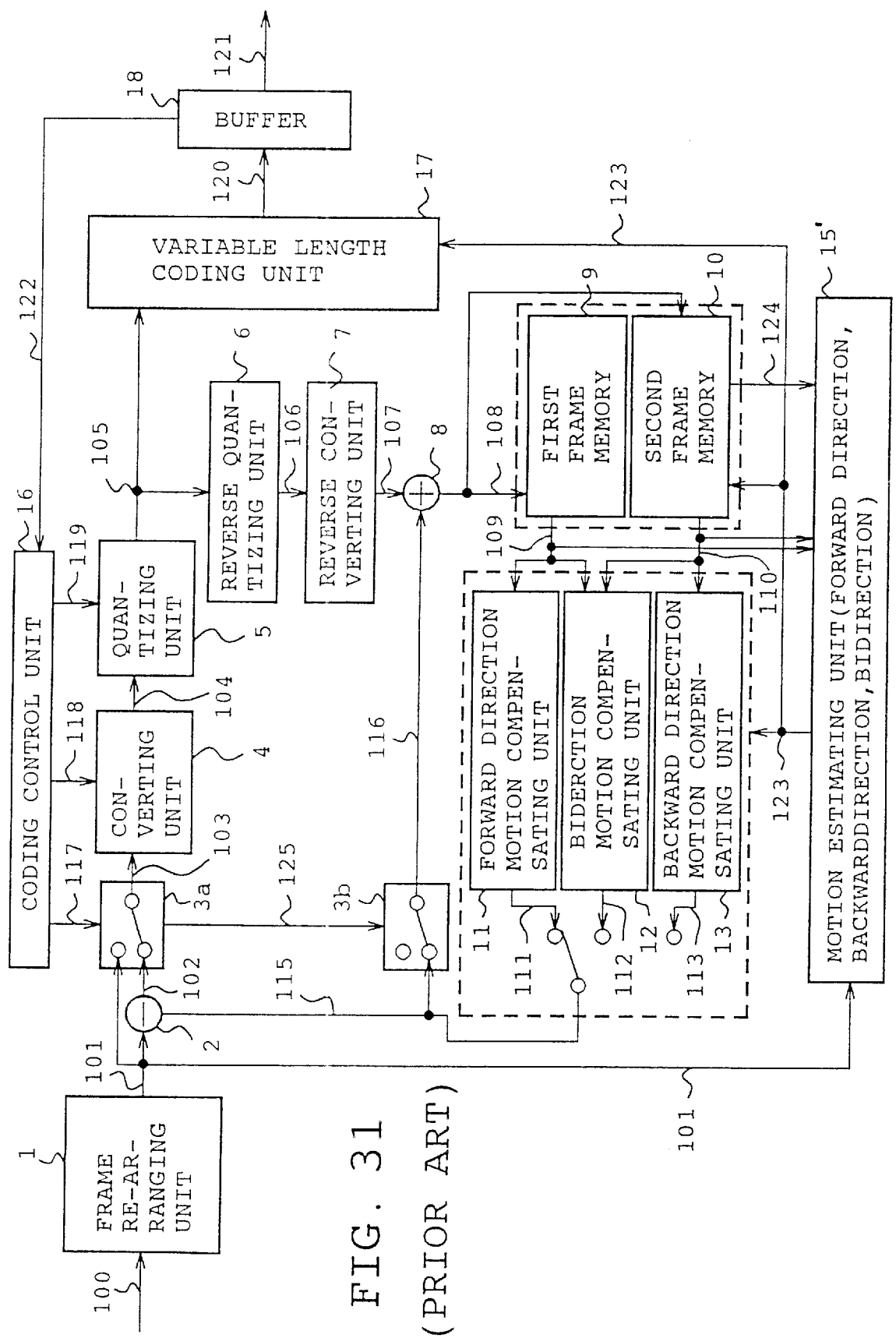
FIG. 31 is a block diagram of a conventional encoder.
Figure 32:
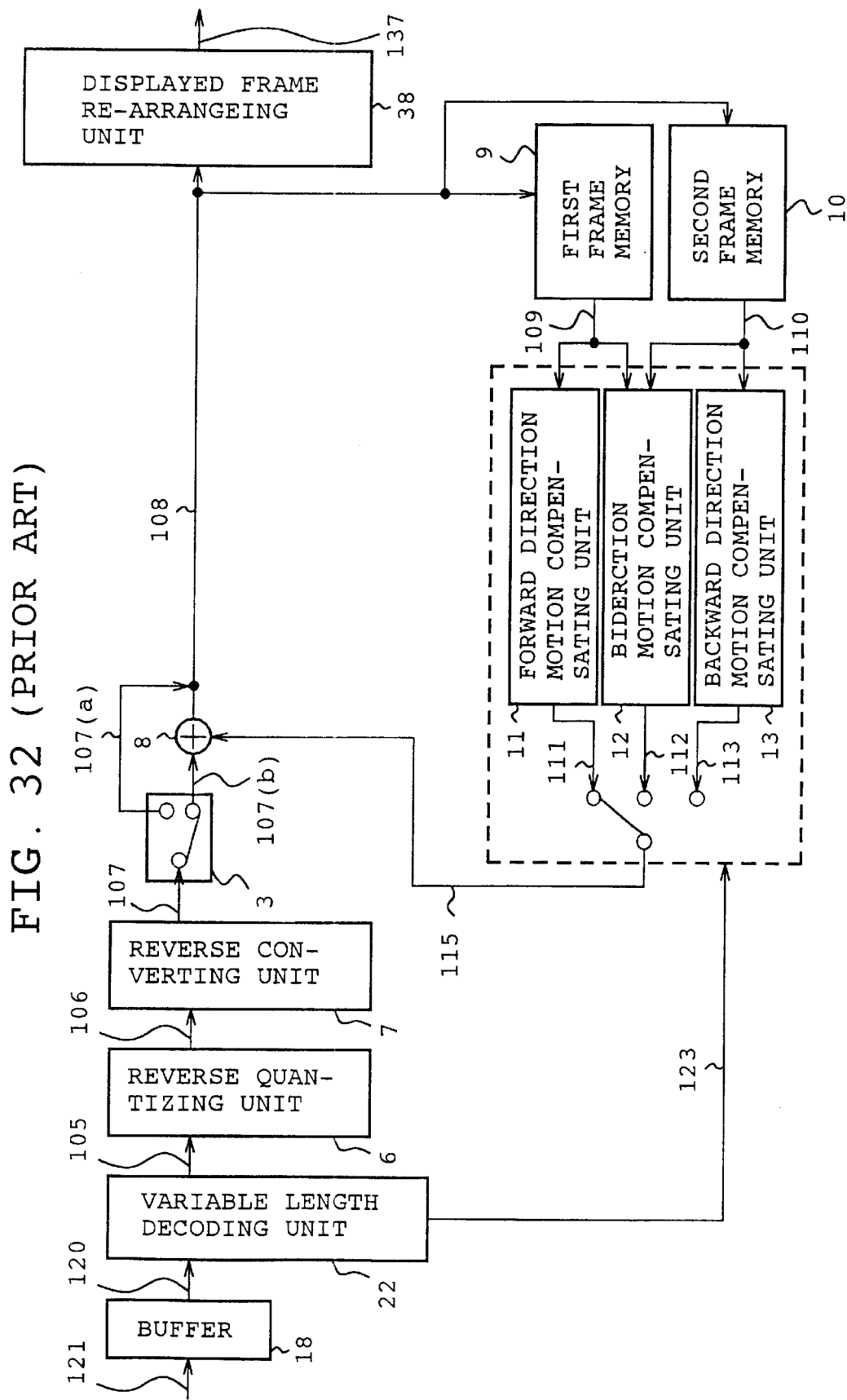
FIG. 32 is a block diagram of a conventional decoder.
Figure 33:
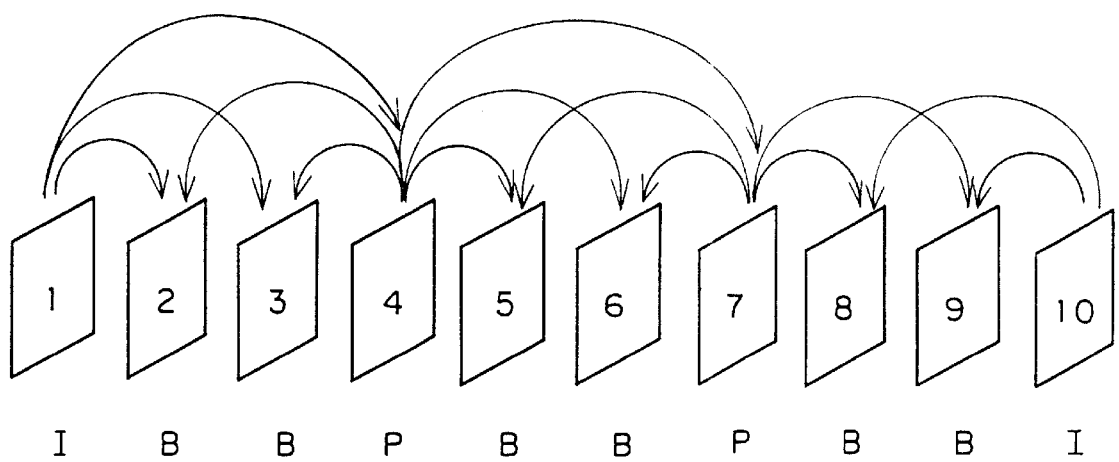
FIG. 33 is a diagrammatic view showing an example of an array of pictures.

FIG. 1 is a block diagram of a coding apparatus for moving pictures according to an embodiment 1 of the present invention. Referring to FIG. 1, reference numeral 21 denotes a motion compensation predicting unit as motion compensation predicting means, 35 a frame memory selecting unit as background image storing control means, and 45 a multiplexing unit. Further, reference numeral 126 denotes a determined motion prediction mode, reference numerals 134 and 135 denote each a selected decoded image, and reference numeral 139 denotes a multiplexed bit stream. Since the other components are similar to those used in the description of the prior art shown in FIGS. 31 to 33, they are denoted by same reference numerals and repetitive description of them is omitted here.

Subsequently, operation will be described.

Basic coding operation is equivalent to motion compensating prediction+conversion coding described hereinabove in connection with the conventional example. Accordingly, only differences will be described here.

A locally decoded image 108 is inputted to the frame memory selecting unit 35, by which it is selected into which one of the first frame memory 9 and the second frame memory 10 it is to be written. Meanwhile, the motion estimating unit 15 reads out reference images 109 and 110 from the frame memories 9 and 10 and outputs a determined motion prediction mode 126 and a motion vector 123 with which the prediction error of the locally decoded image 108 from the re-arranged input image data 101 is minimized.

The motion compensation predicting unit 21 reads out the reference images 109 and 110 and outputs a motion predicted image 115 based on the determined motion prediction mode 126 and the motion vector 123.

The bit stream 121 is multiplexed together with the prediction mode 126 by the multiplexing unit 45 and forwarded from the multiplexing unit 45.

The foregoing is the basic operation of the image coding apparatus of the embodiment 1. In the following, details of the individual units will be described.

Figure 2:
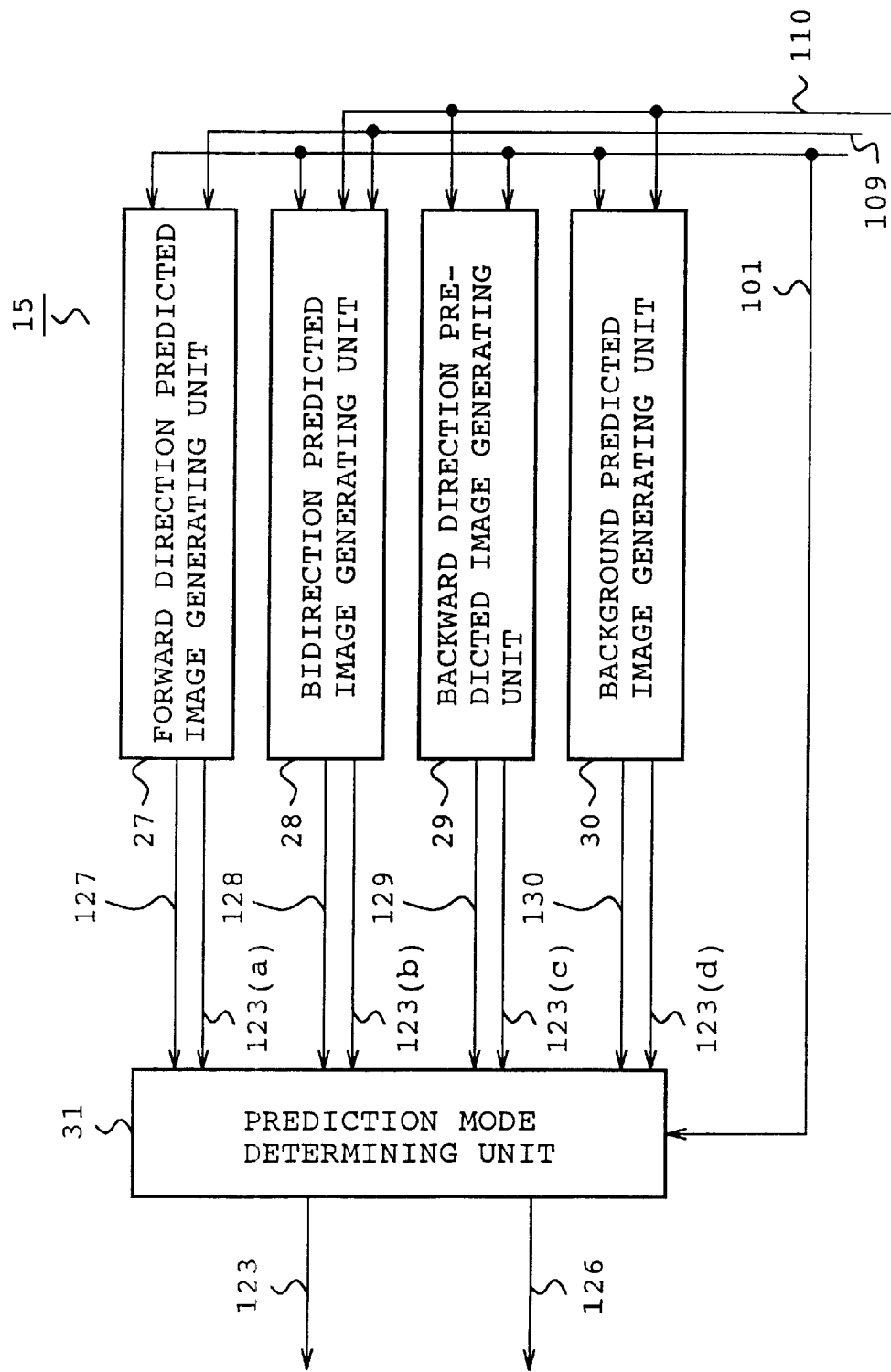
FIG. 2 is a block diagram showing an internal construction of a motion estimating unit of the coding apparatus of the embodiment 1 of the present invention.

FIG. 2 shows an internal construction of the motion estimating unit 15. Referring to FIG. 2, reference numeral 27 denotes a forward direction predicted image generating unit, 28 a bidirection predicted image generating unit, 29 a backward direction predicted image generating unit, 30 a background predicted image generating unit, 31 a prediction mode determining unit, 127 a forward direction predicted image, 128 a bidirection predicted image, 129 a backward direction predicted image, and 130 a background predicted image.

Subsequently, operation of the motion estimating unit 15 will be described.

Each of the predicted image generating units 27, 28, 29 and 30 generates a predicted image in accordance with a predetermined prediction mode.

For example, the forward direction predicted image generating unit 27 reads out reference images 109 from the first frame memory 9 and searches the reference images 109 for an image which has a value nearest to the value of the input image data 101.

To this end, for example, a block matching method which is employed also in the conventional example described in connection with the prior art may be used as it is. In particular, matching is performed for all pixels in macroblocks described above, and an image wherein the sum total of error values exhibits a minimum value is searched for. As a result, the forward direction predicted image generating unit 27 outputs a forward direction predicted image 127.

The backward direction predicted image generating unit 29 performs searching of reference images 110 from the second frame memory 10 and then performs block matching similarly. Then, the backward direction predicted image generating unit 29 outputs a backward direction predicted image 129.

The bidirection predicted image generating unit 28 outputs a bidirection predicted image 128 using the two frame memories 9 and 10. The bidirection predicted image generating unit 28 generates a forward direction predicted image and a backward direction predicted image separately from each other, and generates a bidirection predicted image based on those images.

For example, a technique wherein an average image of the forward direction predicted image and the backward direction predicted image is obtained and determined as a bidirection predicted image 128 may be used.

Meanwhile, the background predicted image generating unit 30 reads out a reference image 110 from the second frame memory and outputs a background predicted image 130 by block matching.

The prediction mode determining unit 31 inputs predicted images selected in the predicted images 127, 128, 129 and 130 and selects a prediction mode in which the difference (prediction error) from the input image 101 is minimized. In this instance, a prediction mode 126 and a motion vector 123 are outputted from the prediction mode determining unit 31. The prediction mode 126 may be determined such that, for example, it has a value 0 for the forward direction prediction mode, another value 1 for the backward direction prediction mode, a further value 2 for the bidirectional prediction mode, and a still further value 3 for the background prediction mode.

It is to be noted that processing operation of the motion vector 123 generated by and outputted from the prediction mode determining unit 31 of FIG. 2 is such as follows.

In particular, when searching of reference images is performed within a predetermined range and a predicted image which exhibits a minimum prediction error is obtained by each of the predicted image generating units, motion vectors 123(a), 123(b), 123(c) and 123(d) are outputted from the predicted image generating units 27 to 30 together with the predicted images, respectively. The outputs are all inputted to the prediction mode determining unit 31, by which one of the predicted images 127, 128, 129 and 130 which exhibits a minimum error from the current image 101 is selected. Thus, the motion vector (one of the motion vectors 123(a), 123(b), 123(c) and 123(d)) which provides the minimum value is finally outputted as a motion vector 123 from the prediction mode determining unit 31.

Figure 3:
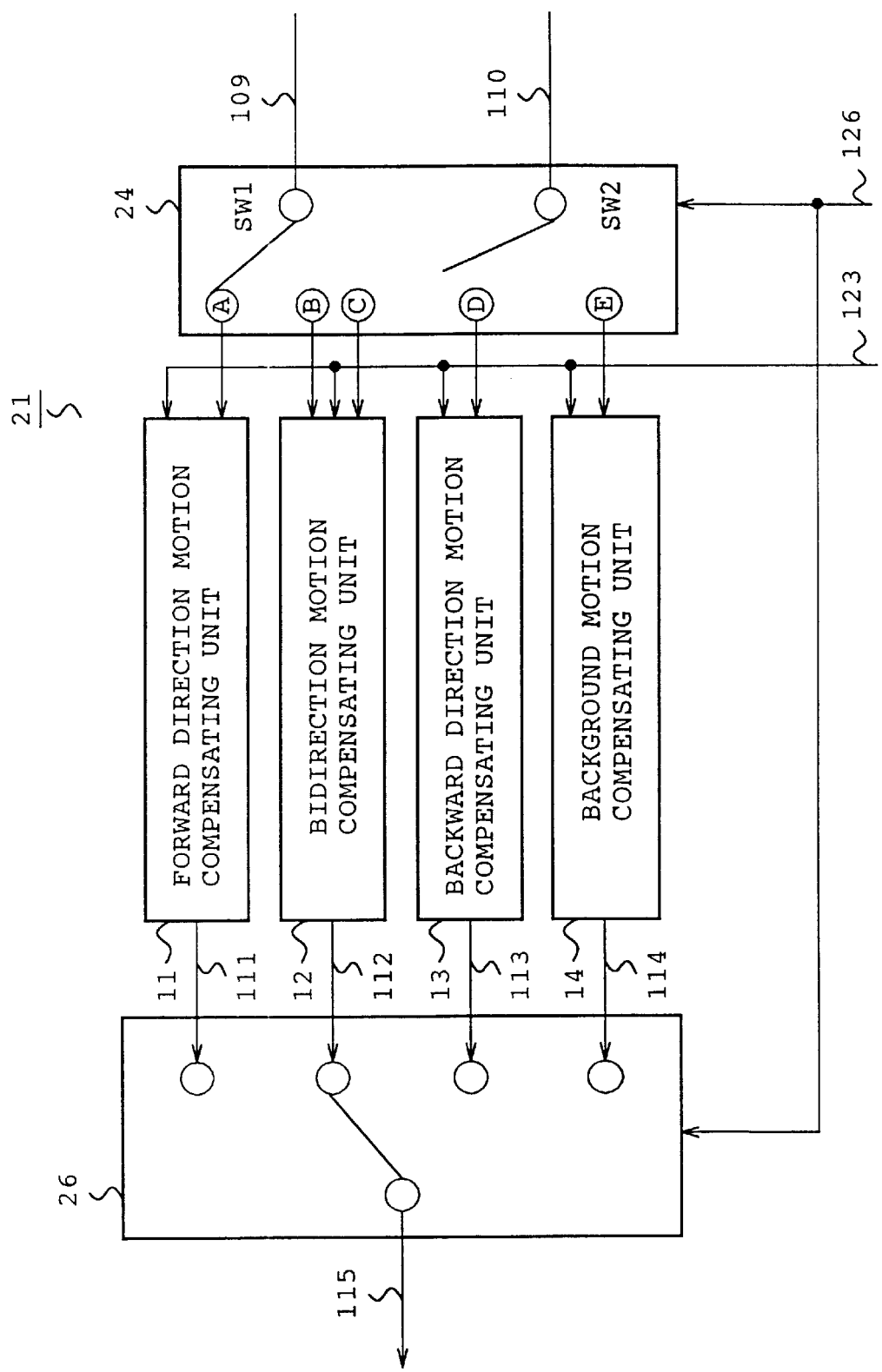
FIG. 3 is a block diagram showing an internal construction of a motion compensation predicting unit of the coding apparatus of the embodiment 1 of the present invention.

FIG. 3 is a block diagram showing an internal construction of the motion compensation predicting unit 21. Referring to FIG. 3, reference numerals 24 and 26 denote each a selector (switch), and reference numeral 114 denotes a background predicted image. Subsequently, operation will be described. In the switch 24, two switches SW1 and SW2 are opened or closed in accordance with the determined motion prediction mode 126.

For example, when the prediction mode 126 outputted from the prediction mode determining unit 31 indicates the bidirection prediction image mode, the switch SW1 of the selector 24 selects a node B and the switch SW2 selects another node C. On the other hand, when the background prediction mode is selected, the switch SW1 is OFF (provides no selection) and the switch SW2 selects a further node E.

In the former case, the bidirection motion compensating unit 12 generates a bidirection predicted image 112 using a motion vector 123. Simultaneously, the output node from the bidirection motion compensating unit 12 is selected by the switch 26. Consequently, the bidirection predicted image 112 from the motion compensation predicting unit 21 is outputted as a determined predicted image 115.

Further, while the embodiment 1 described above is constructed such that it includes a motion estimating unit and a motion compensation predicting unit separately from each other and a prediction mode and a motion vector obtained by the motion estimating unit are sent to the motion compensation predicting unit so that a predicted image is generated by the motion compensation predicting unit, an equivalent function can be realized even by such a construction that the two units are replaced by a motion estimating/compensating unit 39 as seen in FIG. 4.

By the way, in the embodiment 1 described above, similarly as in the conventional example, coding is performed in units of a macroblock which is a processing unit for images.

Meanwhile, in the processing of the MPEG2 of the conventional example described in connection with the prior art, three types of pictures including an I picture, a P picture and a B picture are involved, and a prediction mode is restricted by those pictures.

In particular, in an I picture, all macroblocks are intra coded, and no prediction mode is involved. In a P picture, only forward direction prediction is involved, and in a B picture, three prediction modes of forward direction prediction, backward direction prediction and bidirection prediction are involved.

In the meantime, according to the present invention, in addition to the pictures described above, two other picture types of a PG picture and a PBG picture, which will be hereinafter described, are involved. In a PG picture, two prediction modes including forward direction prediction and background prediction are involved, and in a PBG picture, four prediction modes of forward direction prediction, backward direction prediction, bidirection prediction and background prediction are involved.

Figure 5A:
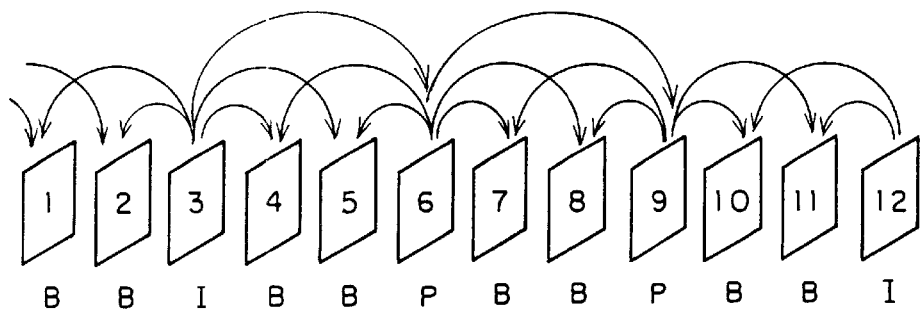
FIGS. 5A to 5C are diagrammatic views illustrating an example of the relationship between patterns of pictures and prediction modes in the embodiment 1 of the present invention.
Figure 5B:
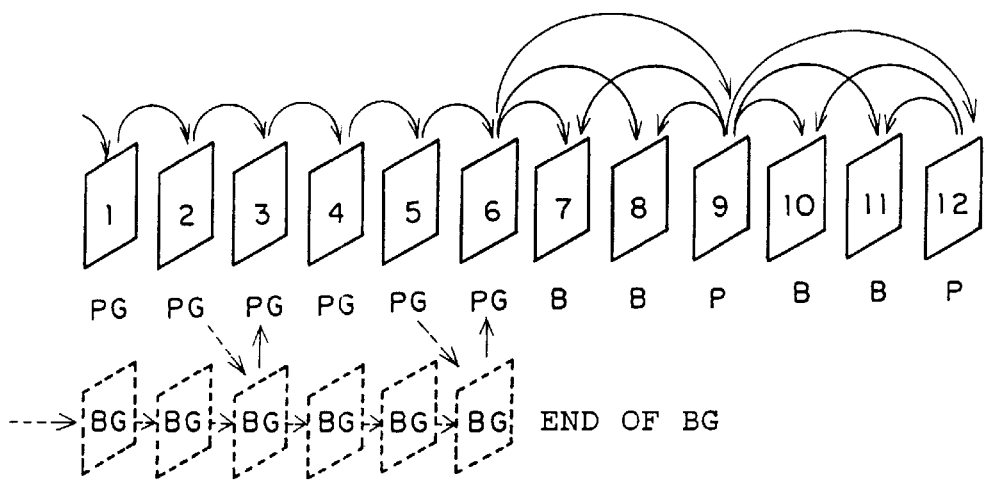
Figure 5C:
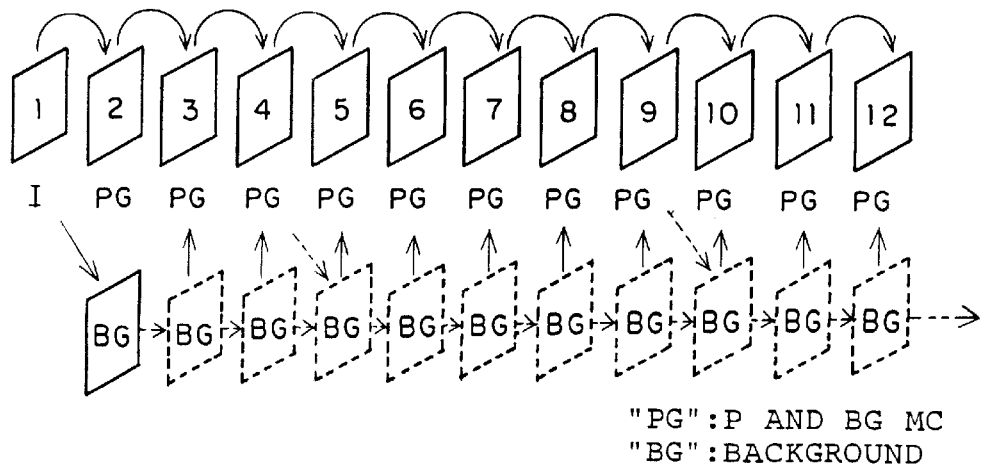

FIGS. 5A, 5B and 5C show examples of patterns of coded pictures. For example, the pattern shown in FIG. 5A is similar to the conventional example, and similar means to that to the prior art may be applied. For the pattern shown in FIG. 5B, two prediction modes including background prediction from a background image (indicated at "BG" in FIG. 5B) written in the second frame memory 10 and forward direction prediction from an immediately preceding decoded picture are involved, and one of the two prediction modes which provides a smaller prediction error is selected.

This operation is performed up to the sixth picture, and then beginning with the seventh picture, the picture structure changes to the structure of P, B, B, P, . . . In this instance, up to the sixth picture, a background image is recorded in the second frame memory 10. Thereafter, however, the ninth picture is first forward direction predicted referring to the sixth picture.

Then, similarly as in the conventional example, the seventh and eighth pictures are predicted referring to decoded pictures of the sixth picture and the ninth picture.

In FIG. 5B, a dotted line extending from the second picture to the "BG" signifies that, for example, contents of the decoded image of the second picture are written as a background image into the second frame memory.

As the writing timing, writing may be performed after each certain interval of time or in response to a control signal from the outside. However, the pattern described above is a mere example, and any other pattern may be available.

FIG. 5C shows a pattern wherein the first picture is an I picture, and it can be seen that a coded picture of the I picture is written as a background image into the second frame memory.

Then, the prediction modes of macroblocks of all pictures beginning with the third picture are selected either to background image prediction or to forward direction prediction. This is effective where the background image is stationary, and is very effective with a scene wherein some person speaks in front of the background image since a phenomenon called occlusion wherein the background image comes into and out of sight as movement of the person occurs. Further, when the background image is a still picture and is known in advance, the background image may be written into the second frame in advance before coding processing is started.

It is to be noted that the pattern of coded pictures may take any pattern other than those shown in FIGS. 5A, 5B and 5C.

Subsequently, operation of the frame memory selecting unit 35 shown in FIG. 1 will be described.

In the frame memory selecting unit 35, it is determined into which one of the first frame memory 9 and the second frame memory 10 the locally decoded image 108 is to be written. As the determination method, a technique may be employed wherein, for example, as seen from another construction of the coding apparatus of the embodiment 1 shown in FIG. 6, a control signal 140 from the frame re-arranging unit 1 is received by the frame memory selecting unit 35 and switching between the first frame memory 9 and the second frame memory 10 is performed in accordance with the received control signal 140 by the frame memory selecting unit 35.

In this instance, since the types of a currently coded picture and another picture to be coded subsequently are known, for example, a decoded image is written into the first frame memory 9 till the "BG" end indicated in FIG. 5B unless a signal from the outside is received, and since the picture structure thereafter changes to the structure of P, B, B, P, . . . , the frame memory for a subject of writing should be selected adaptively as in the conventional example.

Further, as seen in FIG. 5B, as writing of a background image from a decoded picture at a certain position into the second frame memory 10, for example, when a scene change is detected, the decoded image may be written after a predetermined interval of time.

For the detection method for a scene change, a technique conventionally used may be used. For example, a method wherein, if the number of those of macroblocks in one frame with which the prediction error is higher than a threshold value is larger than a certain value, then a scene change is detected.

It is a matter of course that various other techniques than that described just above are available.

Further, while, in the image coding apparatus of the present embodiment 1, the first and second frame memories are provided as storage means to realize a construction for switching of motion compensation prediction, for implementation of the hardware, a plurality of frame memories can be provided at a time by cutting a memory having a storage capacity for the plurality of frame memories based on internal addresses.

As described above, with the image coding apparatus of the present embodiment 1, since a background image is stored and motion compensating prediction is performed using background prediction based on the background image, coding can be performed while keeping a high prediction efficiency without being influenced by a coding sequence.

It is to be noted that, while storage control of a background image into the frame memories is described in the foregoing description, it is a matter of course that the background image here signifies an image which is stored continuously and does not signify contents themselves of an image.

In particular, since images which are successively updated like a conventional picture array include some image which is effective for later prediction, this image is continuously stored independently of storage by the updating procedure, and here, this image is referred to as background image.

Embodiment 2

Figure 7:
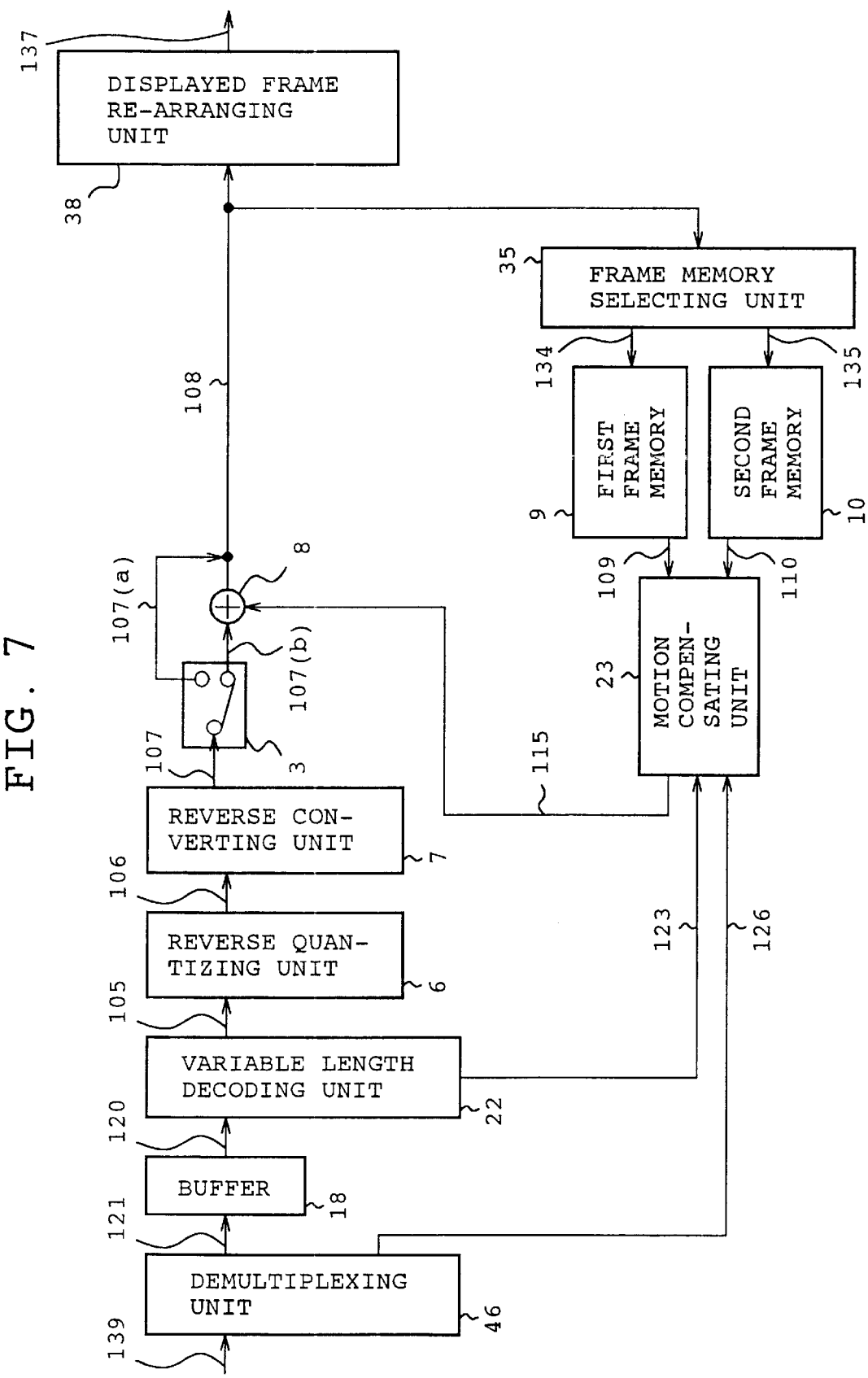
FIG. 7 is a block diagram of a decoding apparatus for moving pictures according to an embodiment 2 of the present invention.

FIG. 7 is a block diagram of a decoding apparatus for moving pictures according to an embodiment 2 of the present invention. Referring to FIG. 7, reference numeral 23 denotes a motion compensating unit, and 46 a demultiplexing unit. The other components than those are similar to those employed in the embodiment 1, and accordingly, repetitive description of them is omitted here.

Operation will be described subsequently.

The decoding apparatus of the present embodiment 2 corresponds to the coding apparatus described in connection with the embodiment 1, and a basic processing procedure for decoding thereof is similar to that of the decoding apparatus described in the conventional example described in the prior art. Thus, description will be given here principally of differences between them.

A locally decoded image 108 is inputted to the frame memory selecting unit 35. The frame memory selecting unit 35 receives the locally decoded image 108, selects a frame memory of a subject of writing, and transfers a selected decoded image 134 or 135 to the first frame memory 9 and the second frame memory 10.

Then, the decoded image is written into the first frame memory 9 or the second frame memory 10.

Meanwhile, the motion compensating unit 23 reads out reference images 109 and 110 from the two frame memories and generates a predicted image 115 in accordance with a predetermined motion prediction mode 126 in a similar procedure to that in local decoding of the coding apparatus.

Figure 8:
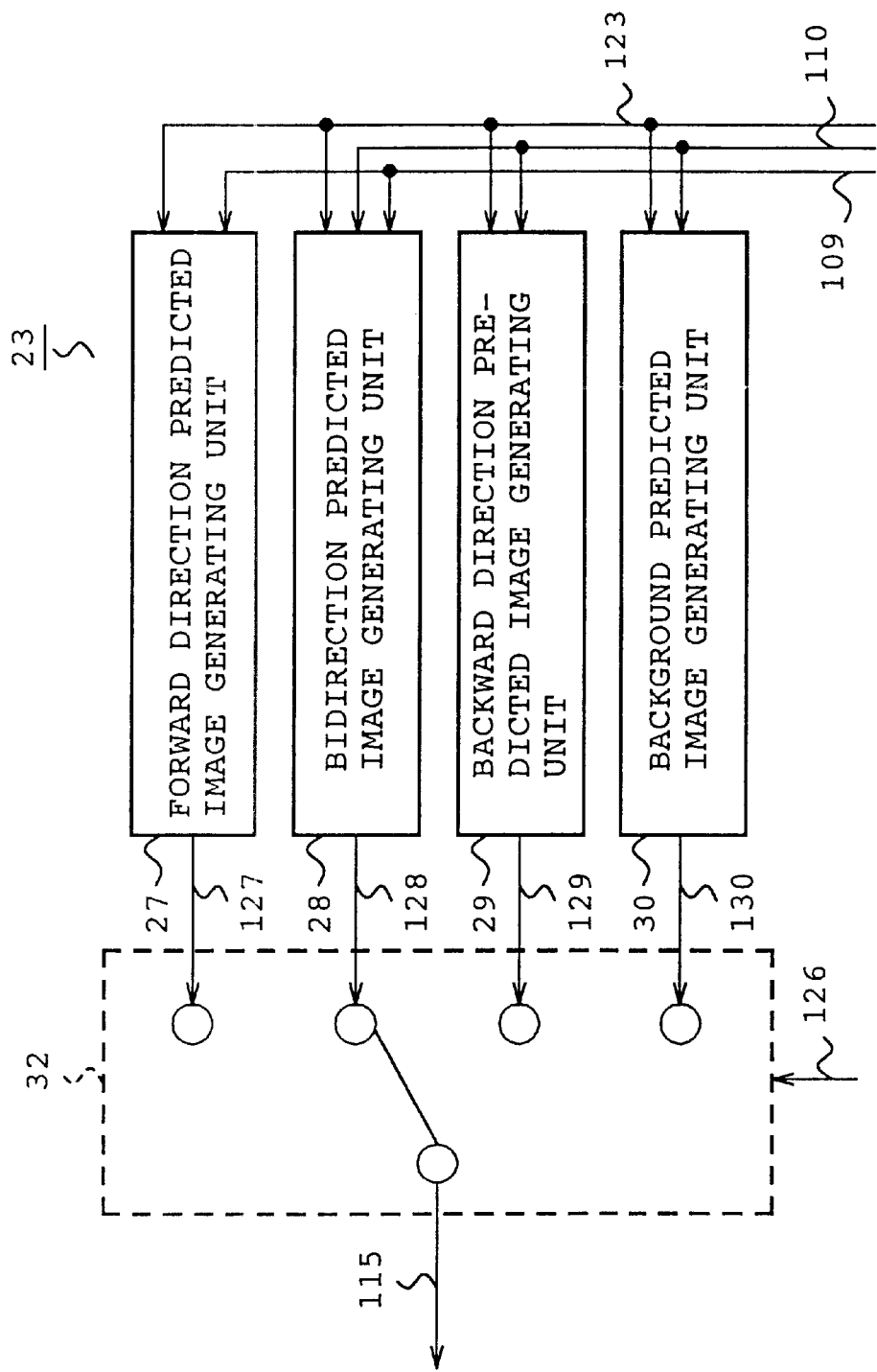
FIG. 8 is a block diagram of a motion compensating unit of the decoding apparatus of the embodiment 2 of the present invention.

FIG. 8 is a block diagram showing an internal construction of the motion compensating unit 23. Referring to FIG. 8, reference numeral 32 denotes a switch.

Subsequently, operation will be described.

One of the predicted image generating units 27 to 30 which corresponds to a selected prediction mode 126 reads out reference images 109 or 110 to generate a predicted image. Further, the switch 32 is switched in response to the selected prediction mode so that a finally determined predicted image 115 is outputted.

Embodiment 3

Figure 9:
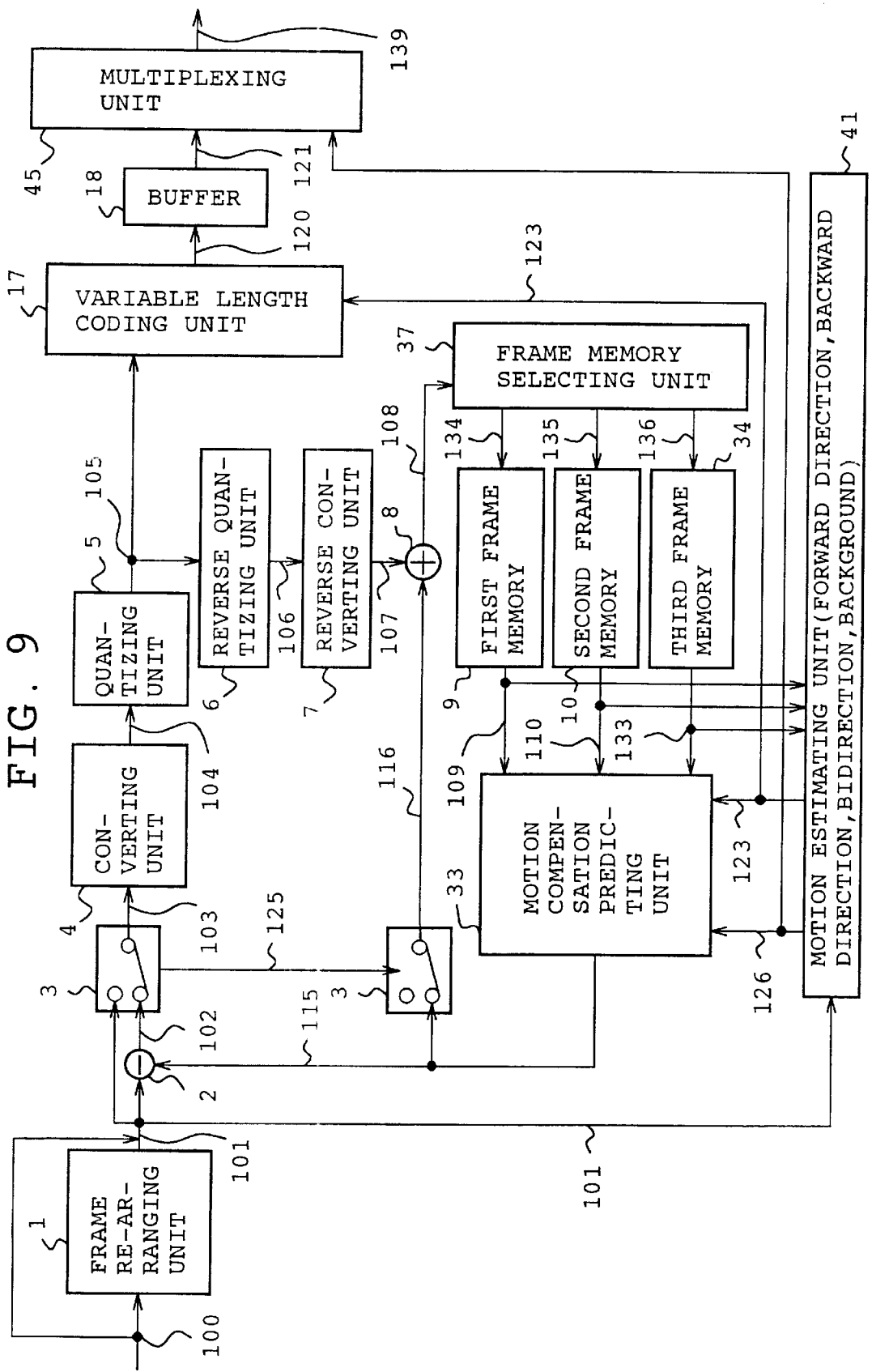
FIG. 9 is a block diagram of a coding apparatus for moving pictures according to an embodiment 3 of the present invention.

FIG. 9 is a block diagram of an image coding apparatus according to an embodiment 3 of the present invention. Referring to FIG. 9, reference numeral 33 denotes a motion compensation predicting unit, 34 a third frame memory, 37 a frame memory selecting unit, 41 a motion estimating unit, 133 a reference image of the third frame memory, and 136 a selected locally decoded image. The other components than those mentioned above are similar to those employed in the embodiment 1, and accordingly, repetitive description of them is omitted here.

The image coding apparatus of the present embodiment 3 is characterized in that it includes the third frame memory in addition to the construction of the image encoder of the embodiment 1 shown in FIG. 1.

Subsequently, operation will be described.

Reference images 109, 110 and 133 are read out from the three frame memories 9, 10 and 34 in which coded images in the past are stored, and motion prediction is performed by the motion estimating unit 41. A motion vector 123 and a prediction mode 126 obtained by the motion prediction are inputted to the motion compensation predicting unit 33.

The motion compensation predicting unit 33 selects a reference image necessary for generation of a predetermined motion predicted image from among the reference images 109, 110 and 133 based on the determined prediction mode 126, and outputs the determined predicted image 115.

Meanwhile, a locally decoded image 108 is written, after it is determined by the frame memory selecting unit 37 into which frame memory the locally decoded image 108 should be written, as a reference image 134, 135 or 136 into the thus determined frame memory.

Figure 10:
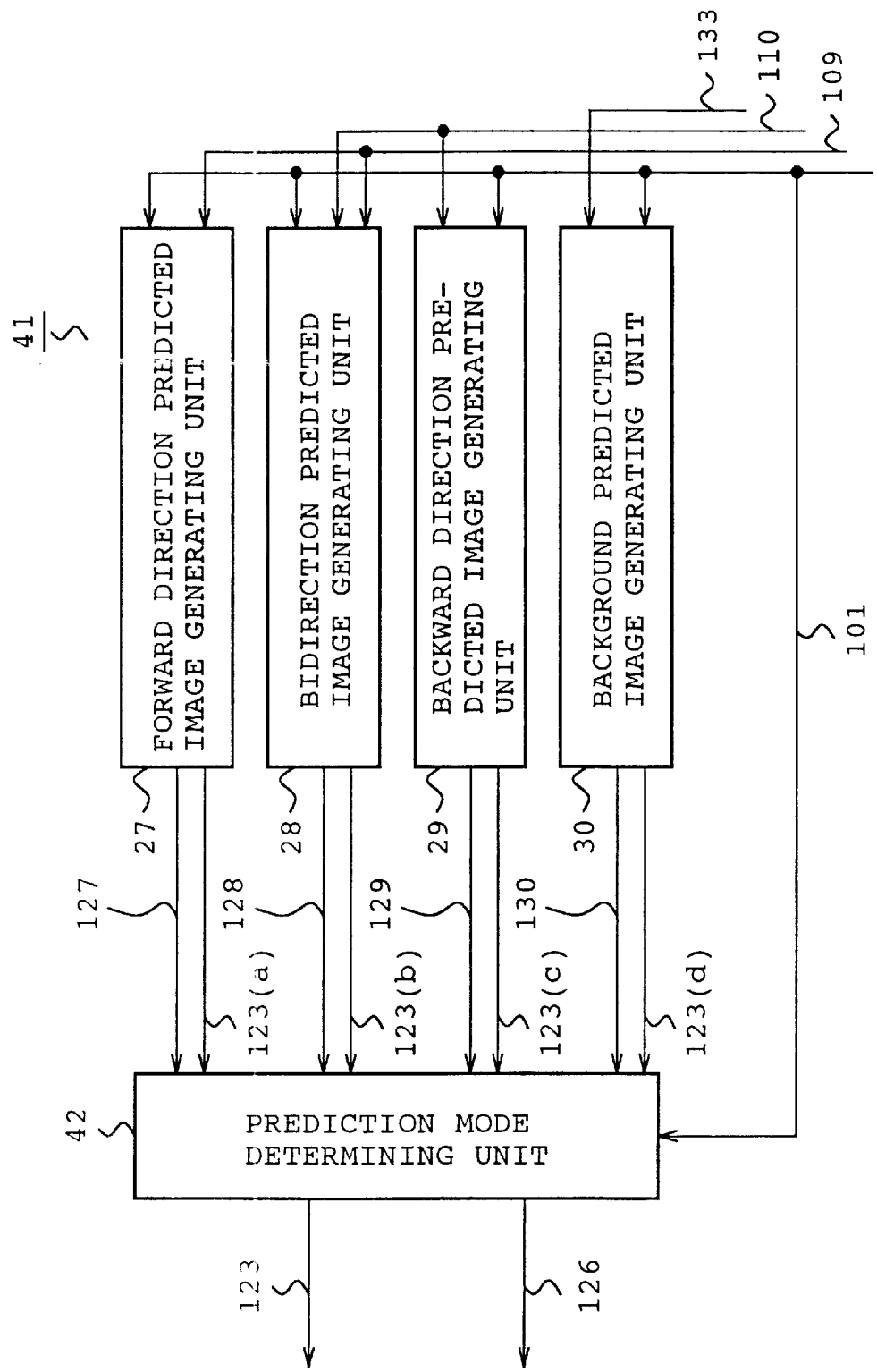
FIG. 10 is a block diagram of a motion estimating unit of the coding apparatus in the embodiment 3 of the present invention.

FIG. 10 shows an internal construction of the motion estimating unit 41. Referring to FIG. 10, reference numeral 42 denotes a prediction mode determining unit.

The motion estimating unit 41 shown in FIG. 10 has a construction which includes, in addition to the motion estimating unit 15 shown in FIG. 2, a background predicted image generating unit 30 for inputting a reference image 133 from the third frame memory.

The forward direction predicted image generating unit 27 inputs an input image 101 and a reference image 109 of the first frame memory and outputs a forward direction predicted image 127, and the bidirection predicted image generating unit 28 inputs the input image 101, the reference image 109 of the first frame memory and a reference image 110 of the second frame memory and outputs a bidirection predicted image 128.

The backward direction predicted image generating unit 29 inputs the input image 101 and the reference image 110 of the second frame memory and outputs a backward direction predicted image 129, and the background predicted image generating unit 30 inputs the input image 101 and a reference image 133 of the third frame memory and outputs a background predicted image 130.

The prediction mode determining unit 42 calculates absolute value differences between predicted images 27, 28, 29 and 30 mentioned above and input the image 101, determines a prediction mode which exhibits a minimum one of the absolute value differences, and outputs the determined prediction mode as a prediction mode 126. Simultaneously, the prediction mode determining unit 42 outputs a motion vector 123.

Figure 11:
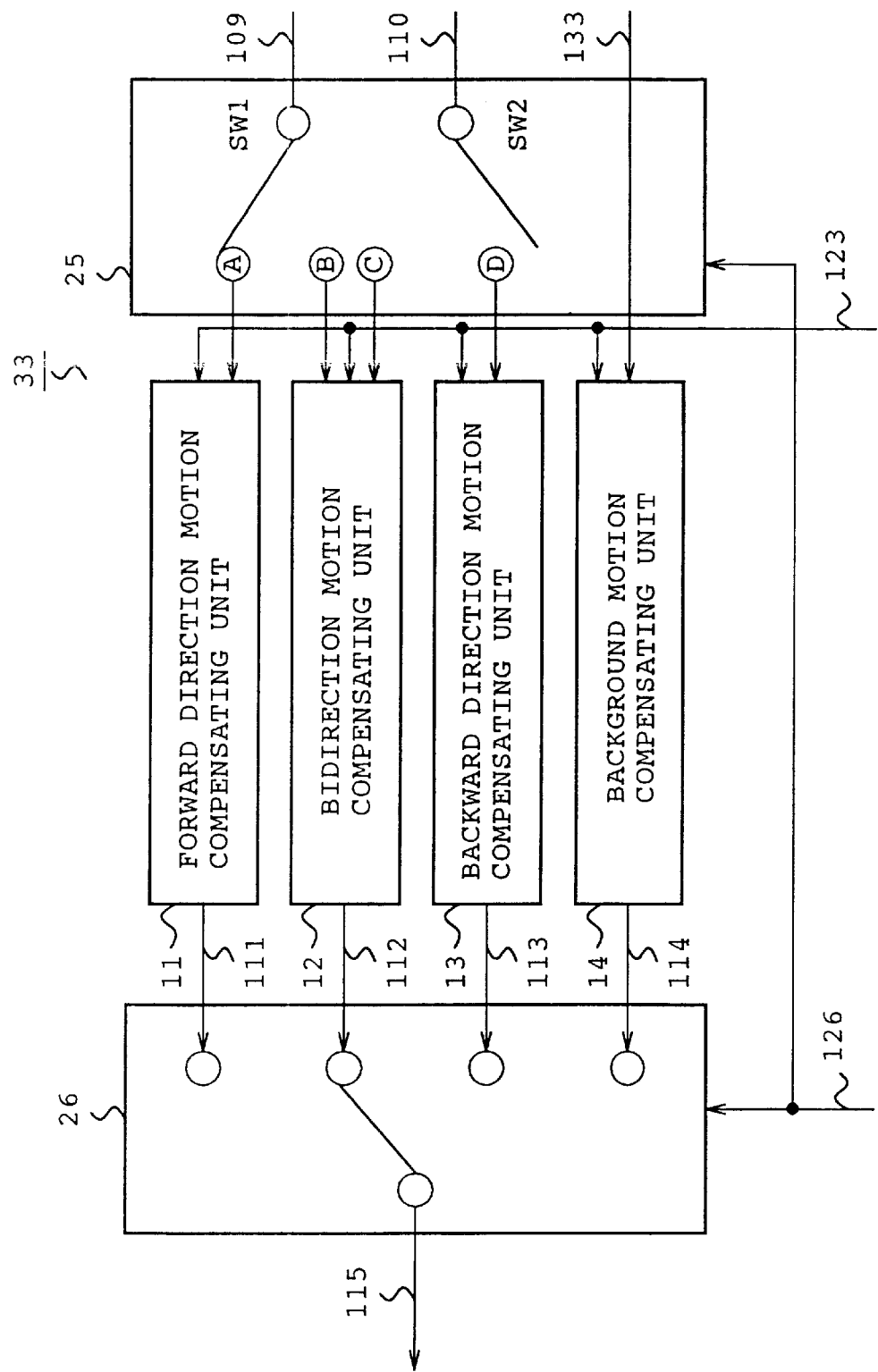
FIG. 11 is a block diagram of a motion compensating unit of the coding apparatus in the embodiment 3 of the present invention.

FIG. 11 is a block diagram of an internal construction of the motion compensation predicting unit 33. Referring to FIG. 11, a switch 25 is opened or closed in response to the prediction mode 126 so that the reference image 109 or 110 is inputted to a selected one of the motion compensating units. For example, when the forward direction prediction mode is selected, a switch SW1 is switched to a node A while another SW2 is switched off. However, when the bidirection prediction mode is selected, the switch SW1 is switched to another node B while the switch SW2 is switched to a further node C.

When the background prediction mode is selected, a reference image 133 is inputted directly and referred to. Subsequently, in the switch 26, the switches SW1 and SW2 are switched to nodes corresponding to the prediction mode 126, and a predicted image 115 determined finally is outputted from the switch 26.

Further, while, in the present embodiment 3, the first, second and third frame memories are provided to realize a construction for switching of motion compensating prediction, for implementation of the hardware, a plurality of frame memories can be provided at a time by cutting a memory having a storage capacity for the plurality of frame memories based on internal addresses.

Figure 12A:
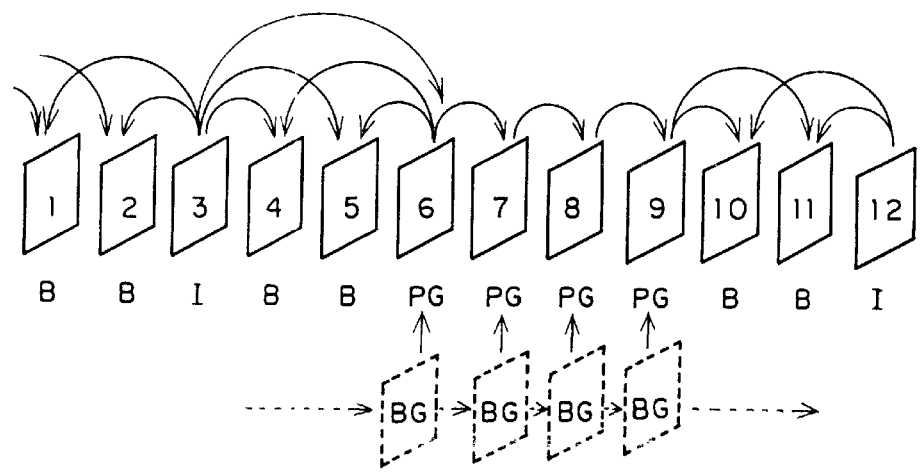
FIGS. 12A, 12B and 12C are diagrammatic views illustrating an example of the relationship between picture patterns and prediction modes in the embodiment 3 of the present invention.
Figure 12B:
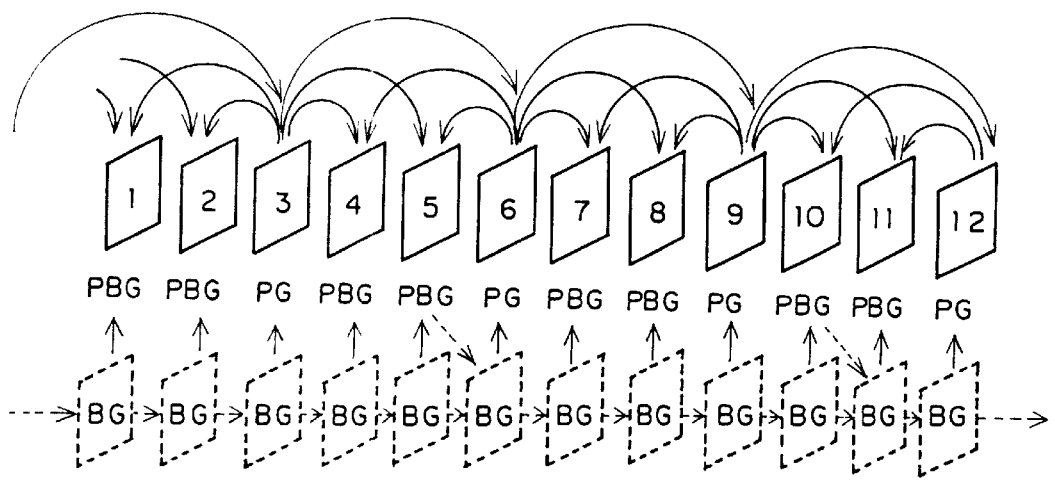
Figure 12C:
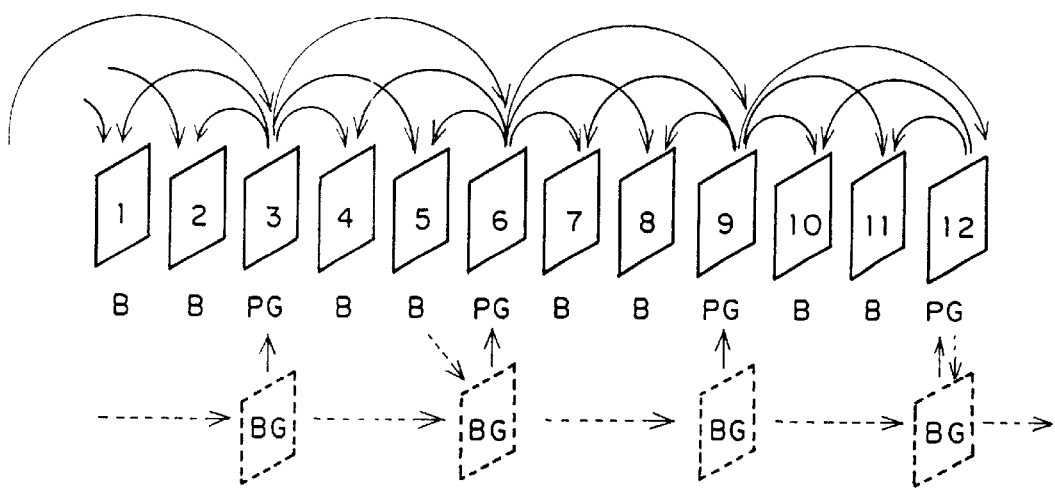

FIGS. 12A, 12B and 12C are diagrammatic views illustrating re-writing operation of the frame memories in the present embodiment 3, and in the following, the re-writing operation will be described including a relationship to the operation of the frame memory selecting unit 37 described hereinabove with reference to FIGS. 6A, 6B and 6C.

FIGS. 12A, 12B and 12C show three different patterns. In FIG. 12A, PG pictures of background prediction and forward direction prediction appear beginning with the sixth picture, and the construction continues up to the ninth picture. Thereafter, the structure of IBBP is restored beginning with the 10th picture.

In FIG. 12B, switching among all prediction modes of forward direction prediction, backward direction prediction, bidirection prediction and background prediction is possible with the first, second, fourth, fifth, seventh, eighth, tenth and eleventh pictures, and the prediction efficiency is highest. Further, also in this instance, while writing as a background image into the third frame memory is enabled at any time, in the example of FIG. 12B, writing into the third frame memory for a background image is performed from the fifth and tenth pictures.

In FIG. 12C, PG pictures of background prediction and forward direction prediction appear with the third, sixth, ninth and twelfth pictures.

In those operations, since it is already known of which picture type a currently decoded picture is, a frame memory into which the locally decoded image 108 is to be written is determined by itself in accordance with the picture type by the frame memory selecting unit 37. In particular, where the pattern has the structure of IBBP, for the I picture, the locally decoded image 108 is written into the first frame memory, but, for the P picture, the locally decoded image 108 is written into the second frame memory. For the B pictures, the locally decoded image 108 is written into none of the frame memories.

It is to be noted that, as described already, a certain decoded image is written as a background image also into the third frame after a certain interval of time or in response to a control signal from the outside.

Embodiment 4

Figure 13:
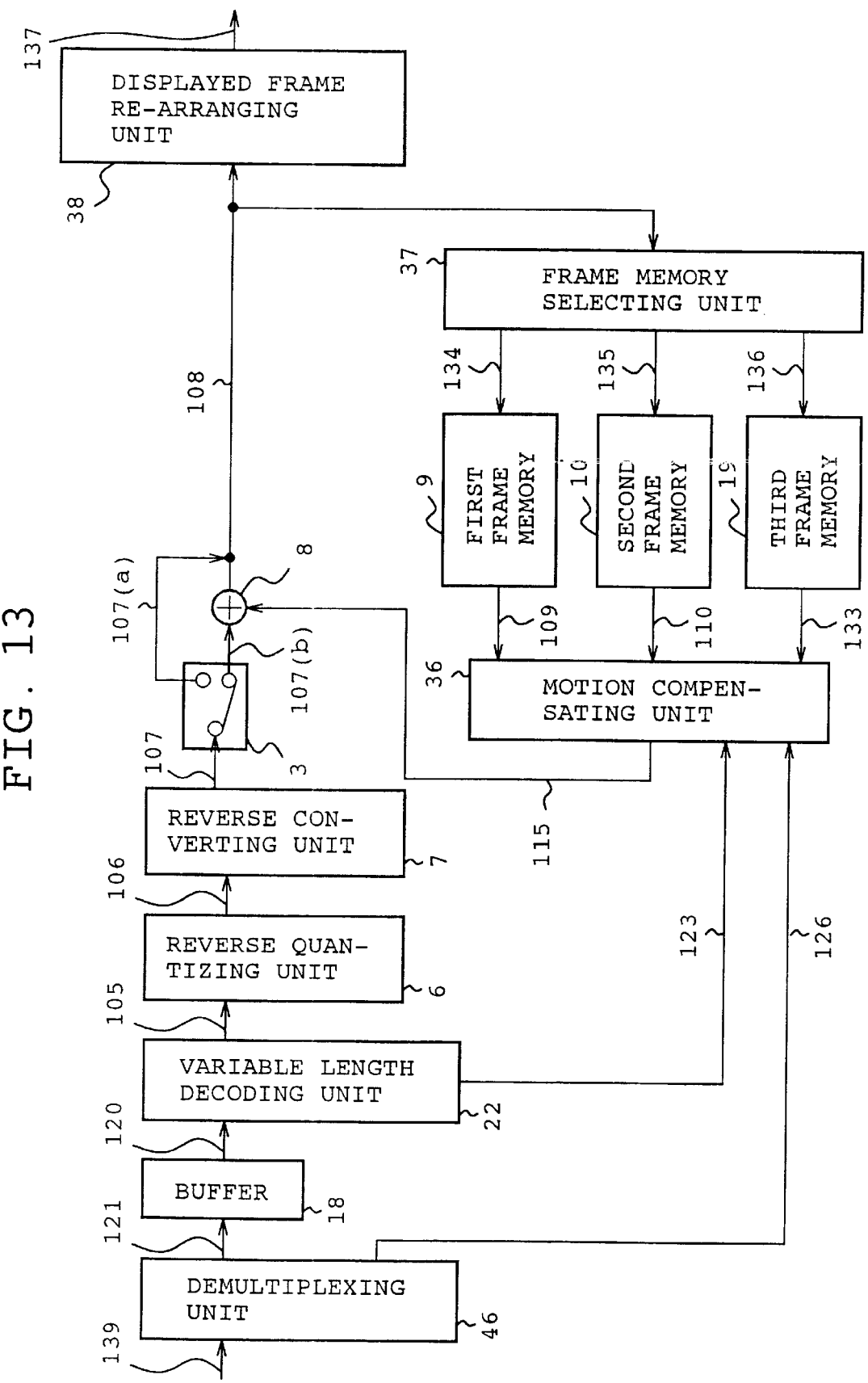
FIG. 13 is a block diagram of a decoding apparatus for moving pictures according to an embodiment 4 of the present invention.

FIG. 13 is a block diagram of a decoding apparatus for moving pictures according to an embodiment 4 of the present invention. The decoding apparatus corresponds to the coding apparatus of the embodiment 3 shown in FIG. 9. Referring to FIG. 13, reference numeral 36 denotes a motion compensating unit. Of the other components than that just mentioned, those components denoted by the same reference numerals to those used in the embodiments 1 to 3 are similar elements, and accordingly, repetitive description of them is omitted here.

Subsequently, operation will be described.

The motion compensating unit 36 performs motion compensation referring to reference images 109, 110 and 133 read out from the first frame memory 9, the second frame memory 10 and the third frame memory 11 and outputs a predicted image 115.

Decoded images are re-arranged by the displayed frame re-arranging unit 38 again such that they appear in order of time for displaying, and an output image 137 is obtained as a result of the re-arrangement.

Figure 14:
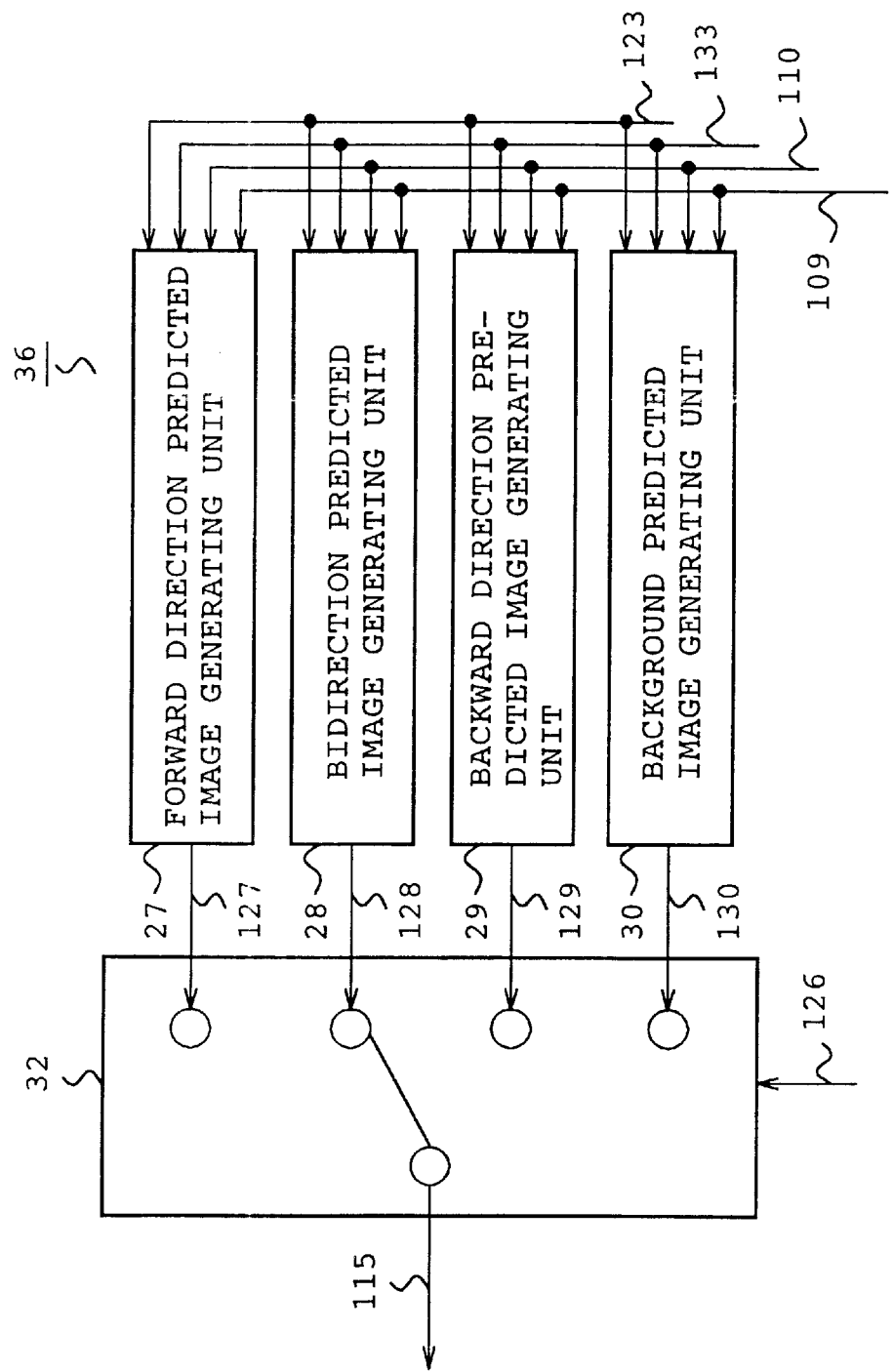
FIG. 14 is a block diagram of a motion compensating unit of the decoding apparatus of the embodiment 4 of the present invention.

FIG. 14 is a block diagram showing an internal construction of the motion compensating unit 36. Referring to FIG. 14, one of predicted images generated by the individual predicted image generating units is selected in response to a prediction mode 126 by the switch 32. Then, the selected predicted image 115 is outputted to the adding unit 8.

The fourth embodiment presents similar effects to those of the imaging coding apparatus of the embodiment 3.

Embodiment 5

While the image coding apparatus such as embodiment 1 described above performs re-writing to a background image illustrated in FIGS. 5B and 5C in units of a picture, it is possible to perform prediction efficiently if writing to a background image is performed in units of a macroblock.

As the technique for re-writing to a background image, for example, a technique wherein updating is performed after each predetermined interval of time in coding processing or another technique wherein, when all pixels in a macroblock at a certain position are not referred to for prediction for more than a certain period of time, a control signal is generated to re-write only the macroblock in a background image with a decoded image may be used.

Figure 15:
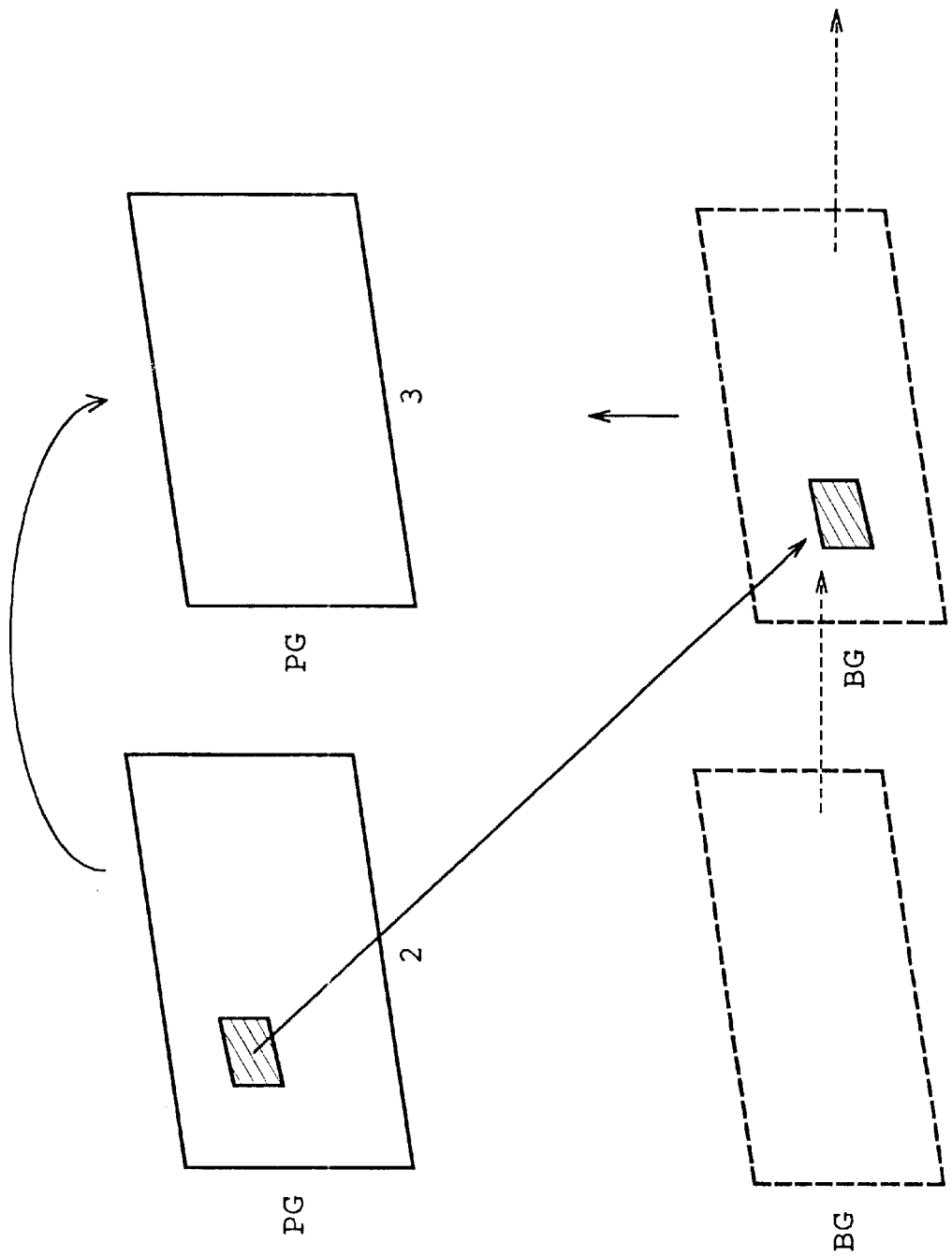
FIG. 15 is a diagrammatic view illustrating re-writing of a picture in a frame memory in units of a macroblock in a coding apparatus according to an embodiment 5 of the present invention.

FIG. 15 illustrates this. Referring to FIG. 15, at a timing for writing from the second picture of FIG. 5B into the background image "BG", only a macroblock in a region of slanted lines in FIG. 15 is written as it is into the second frame memory and is used as part of a reference image for direction of the third picture.

Similarly, also where the image coding apparatus such as embodiment 3 described above includes three frame memories, re-writing into a background image shown in FIGS. 12B and 12C is performed in units of a macroblock. As the technique for re-writing, the same operation as described above may be performed.

As described above, since re-writing of contents of an image in each frame memory is performed in units of a macroblock after each certain interval of time or in response to a control signal from the outside, the contents of the image in the frame memory can always be kept, at a finer level, to contents from which a high prediction efficiency for background prediction can be obtained.

Embodiment 6

Also an image decoding apparatus which corresponds to the image coding apparatus of the embodiment 5 can perform re-writing to the background image in units of a macroblock.

For example, in an image decoding apparatus shown in FIG. 7, after a decoded image 108 is selected by the frame memory selecting unit 35, a macroblock of the background image at the same position as that of the macroblock mentioned above is re-written to a selected decoded image 135. It is to be noted that the updating in units of a macroblock may be performed after a certain interval of time or in response to a control signal from the outside.

Similarly, also in the decoding apparatus shown in FIG. 13, which includes three frame memories, re-writing to a background image illustrated in FIGS. 12B and 12C is performed in units of a macroblock. As the technique for re-writing, the same operation as described above may be performed.

Embodiment 7

It is also effective to vary the motion searching range upon background prediction by the motion estimating unit 15 of the image coding apparatus of the embodiment 1 shown in FIG. 1 or the motion compensation predicting unit 33 shown in FIG. 3 to the searching range of forward direction prediction or backward direction prediction.

To this end, it is advisable to set, making use of the fact that, for example, background prediction acts effectively when the motion vector from the background is 0, the searching range to a smaller range than that for any other prediction.

The image coding apparatus of the present embodiment 7 exhibits an additional effect in that the searching time is reduced and that, since codes obtained by variable length coding of motion vectors can be set comparatively short, the coding information amount of motion vectors can be reduced.

Embodiment 8

Figure 16:
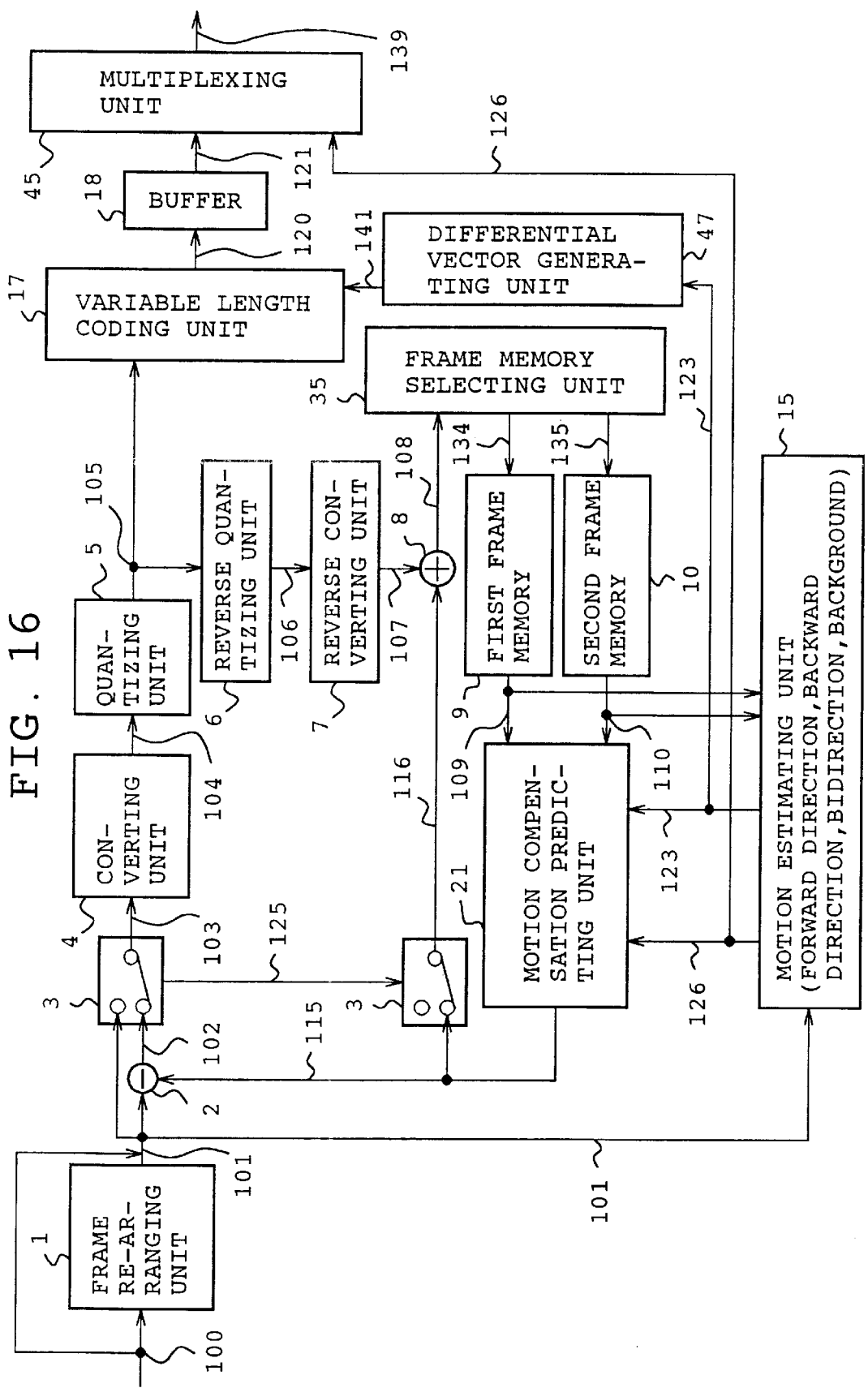
FIG. 16 is a block diagram of a coding apparatus according to an embodiment 8 of the present invention.

FIG. 16 is a block diagram of an image coding apparatus according to an embodiment 8 of the present invention. Referring to FIG. 16, reference numeral 47 denotes a differential vector generating unit, and 141 a difference vector. Of the other components than those mentioned above, those components denoted by the same reference numerals to those used in the embodiment 1 are similar elements, and accordingly, repetitive description of them is omitted here.

The differential vector generating unit 47 calculates a difference vector 141 between a current motion vector 123 and a reference vector. Then, the difference vector 141 is variable length coded by the variable length coding unit 17.

FIGS. 17A and 17B illustrates a coding method for a motion vector, and particularly, FIG. 17A shows a reference motion vector for the first frame memory 9 and FIG. 17B shows a reference motion vector for the second frame memory 10.

Operation will be described subsequently.

Referring to FIGS. 17A and 17B, each rectangular frame denotes one macroblock. It is known that, for a motion vector MV(1) of a current macroblock obtained by reading out a reference image in the first frame memory and performing motion compensating prediction of the reference image, it is effective to actually variable length code, using three motion vectors MV1(1), MV2(1) and MV3(1) of already coded and decoded macroblocks as candidate vectors, difference values of the motion vector MV(1) from them.

For example, if it is tried to use a median of the motion vectors MV1(1), MV2(1) and MV3(1) as a candidate vector, then the difference vector PMV(1) can be represented by the following expression:

$$PMV(1)=MV(1)-\text{median}(MV1(1), MV2(1), MV3(1))$$

where "median" is an operator for calculation of a median.

Similarly, for the second frame memory,

PMV(2)=MV(2)−median (MV1(2), MV2(2), MV3(2))

Figure 18:
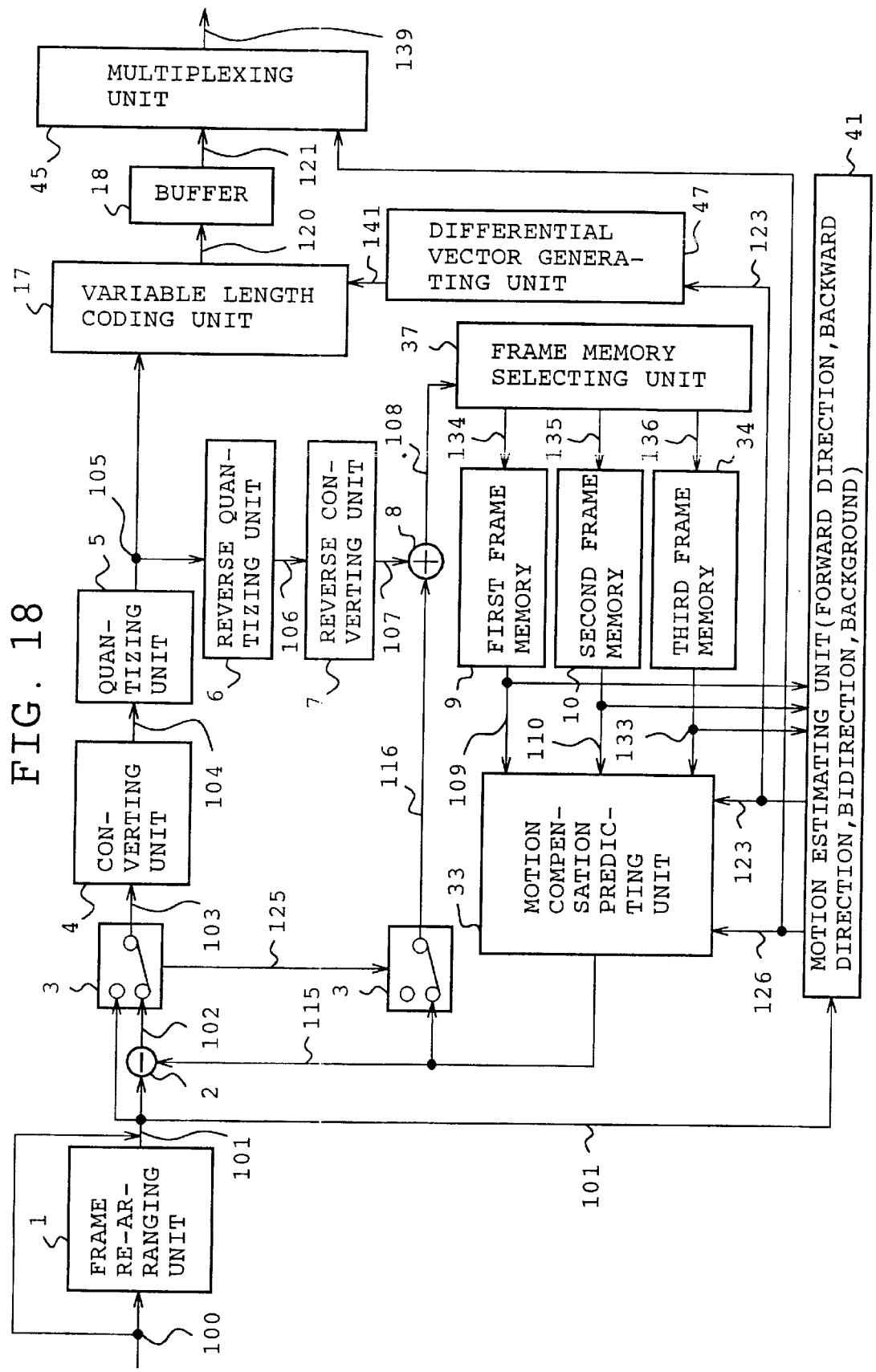
FIG. 18 is a block diagram showing another construction of the coding apparatus according to the embodiment 8 of the present invention.

FIG. 18 is a block diagram of an image coding apparatus which includes a differential vector generating unit 47 in addition to the construction of the image coding apparatus shown in FIG. 9.

For calculation of a difference vector, in addition to the operation described above, a reference motion vector PMV (3) for the third frame memory may be calculated and variable length coded.

The information generation amount of motion vectors can be supplied in such a manner as described above.

Embodiment 9

Figure 19:
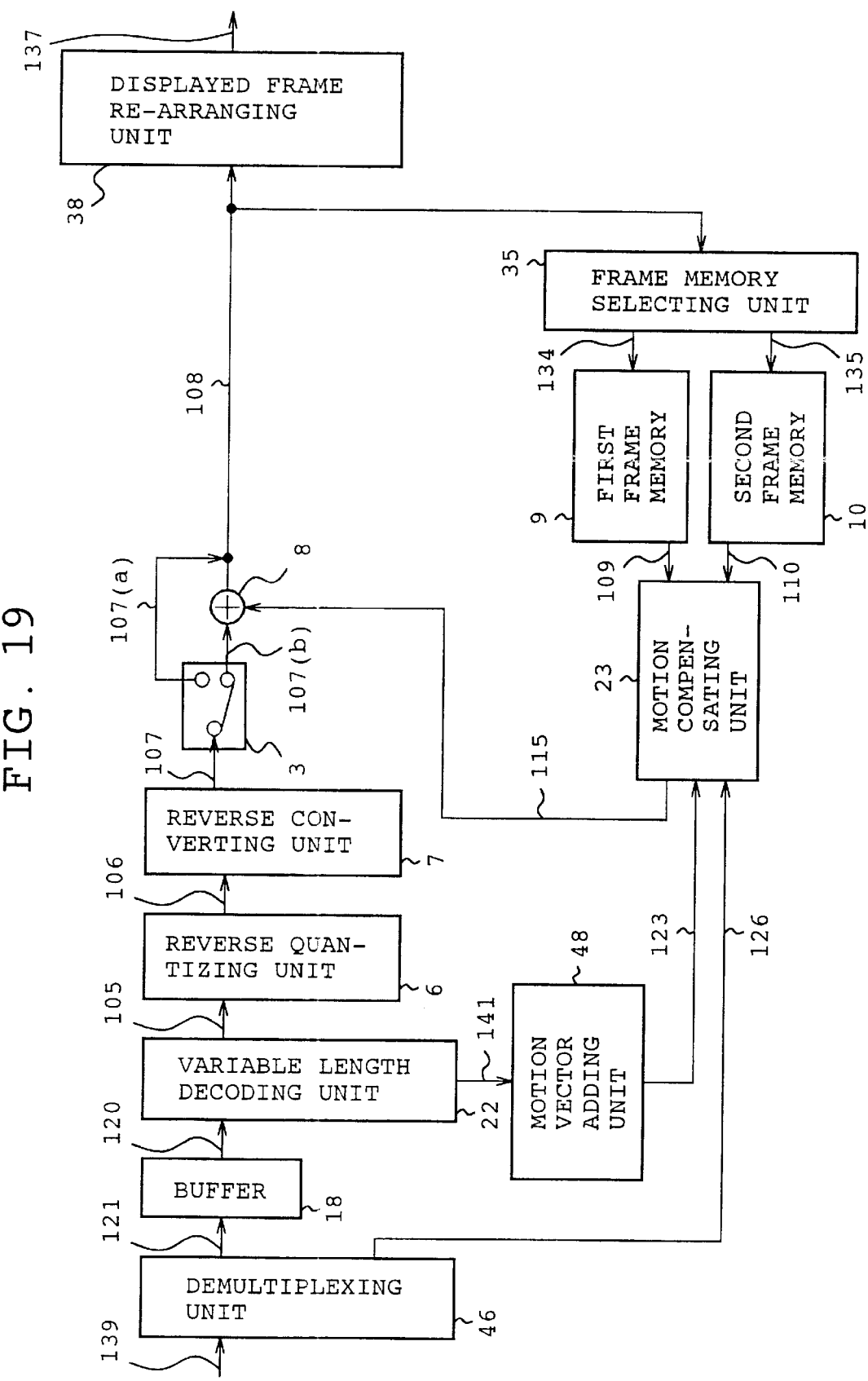
FIG. 19 is a block diagram of a decoding apparatus according to an embodiment 9 of the present invention.
Figure 20:
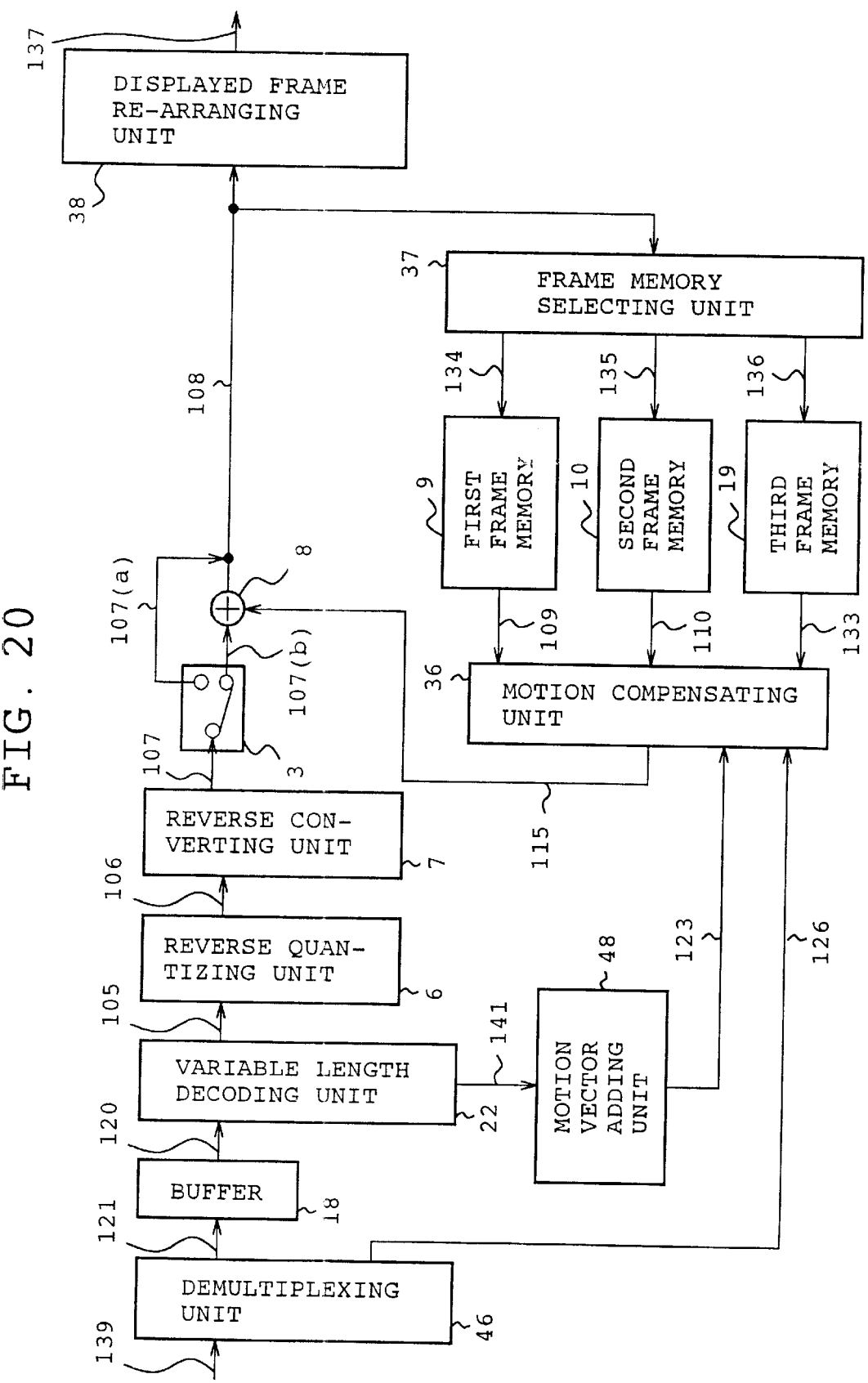
FIG. 20 is a block diagram showing another construction of the decoding apparatus according to the embodiment 9 of the present invention.

FIGS. 19 and 20 are block diagrams of decoding apparatus which correspond to the coding apparatus of the embodiment 8 described hereinabove with reference to FIGS. 16 and 18 in which a difference vector is used, respectively. Referring to FIGS. 19 and 20, reference numeral 48 denotes a motion vector adding unit. The other components are similar to those of the decoding apparatus of the embodiment 2 shown in FIG. 7, and accordingly, repetitive description of them is omitted here.

In the decoding apparatus of the present embodiment 9, a difference vector 141 variable length decoded by the variable length decoding unit 22 is added to a reference vector by the variable length decoding unit 22 to calculate a motion vector 123.

The processing following it is the same as the operation of the decoding apparatus of the embodiment 2 shown in FIG. 7, and therefore, repetitive description of it is omitted here.

Embodiment 10

While, in the coding apparatus of FIG. 1, an entire screen in a picture is used as a subject of coding, the image coding apparatus of the present embodiment 10 is constructed such that the picture type for coding is variable in units of one of a plurality of subject images (objects) which construct the screen.

Figure 21:
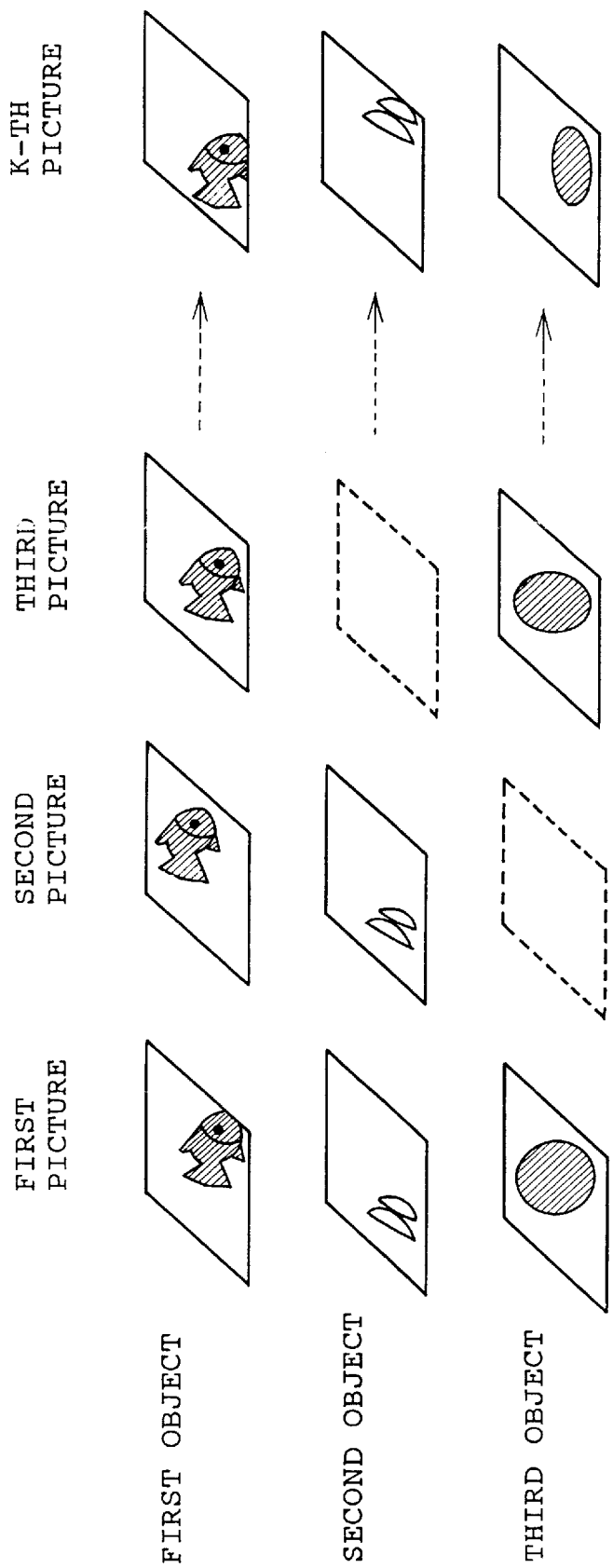
FIG. 21 is a diagrammatic view illustrating the relationship between pictures and objects.

Referring to FIG. 21, for example, if a screen is composed of an object 1 (fish), an object 2 (water: background picture) and an object 3 (ball) and boundaries among them are known, then those objects can be coded using different techniques from one another.

In the image coding apparatus of the present embodiment 10, such coding techniques are realized by using different picture types from one another. For example, since the object 1 exhibits a comparatively large amount of motion, the construction of picture types of FIG. 5A is used for the object 1 taking it into consideration that bidirection prediction is higher in prediction efficiency than background prediction.

On the other hand, since the object 2 is an image which exhibits little motion, it is effective to use background prediction for it. Accordingly, the construction of FIG. 5C should be used. However, if such a variation that a scene changes rapidly occurs with a certain midst picture, then the construction which includes B pictures beginning with the midst picture as seen in FIG. 5B should be employed.

Figure 22:
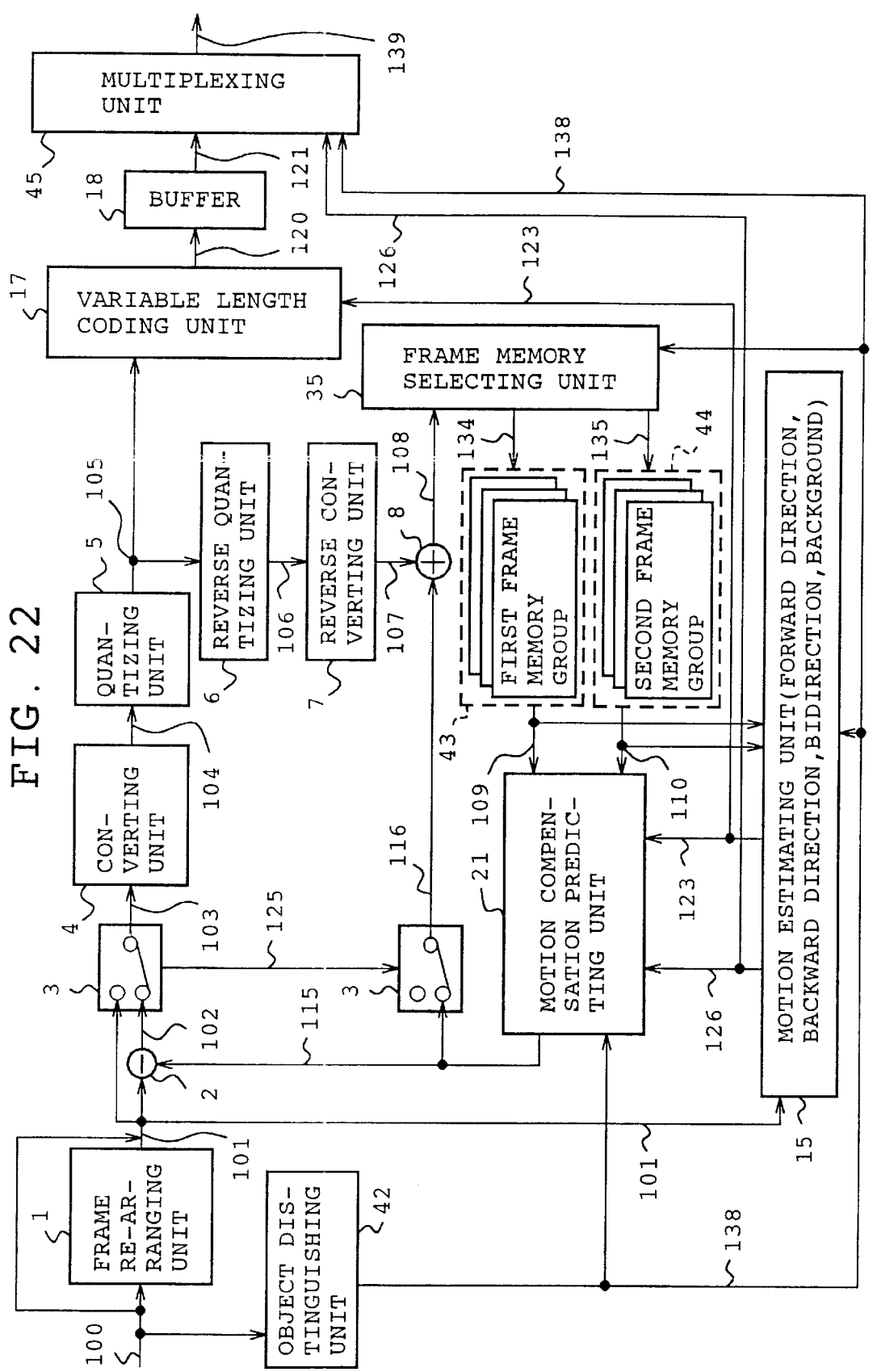
FIG. 22 is a block diagram of a coding apparatus according embodiments 10 and 15 of the present invention.

FIG. 22 is a block diagram showing a concrete example of the image coding apparatus provided by the present embodiment 10. Referring to FIG. 22, reference numeral 42 denotes an object distinguishing unit, 43 a first frame memory group, 44 a second frame memory group, and 138 an object identification signal.

Operation will be described subsequently.

An input image 100 includes identification signals applied to individual objects in advance, and the identification signals are identified by the object distinguishing unit 42. The number of each of the thus identified objects is outputted as an object identification signal 138 from the object distinguishing unit 42.

The motion estimating unit 15 selects, from among the first frame memory group 43 and the second frame memory group 44, a frame memory which corresponds to the object of the subject of coding in accordance with the object identification signal 138, reads out a reference image from the selected frame memory and performs motion prediction.

Meanwhile, the motion compensation predicting unit 21 selects a frame memory corresponding to a predetermined object in accordance with a motion prediction mode 126 determined by the motion estimating unit 15 and generates a predicted image 115.

On the other hand, the frame memory selecting unit 35 writes a decoded image 108 into one of the frame memories of a predetermined one of the frame memory groups which corresponds to a predetermined object in accordance with the object identification signal 138.

Further, the object identification signal 138 is multiplexed together with other coding information by the multiplexing unit 45 and sent out as a multiplexed bit stream 139 to an external apparatus (not shown).

While, in the image coding apparatus of the present embodiment 10, the first and second memory groups are provided to realize the construction for switching of motion compensating prediction, for implementation of the hardware, a plurality of frame memories can be provided at a time by cutting a memory having a storage capacity for the plurality of frame memories based on internal addresses. As described above, with the image coding apparatus of the present embodiment 10, since a prediction structure which conforms with motion of an object can be taken, the overall prediction efficiency is improved.

Embodiment 11

Figure 23:
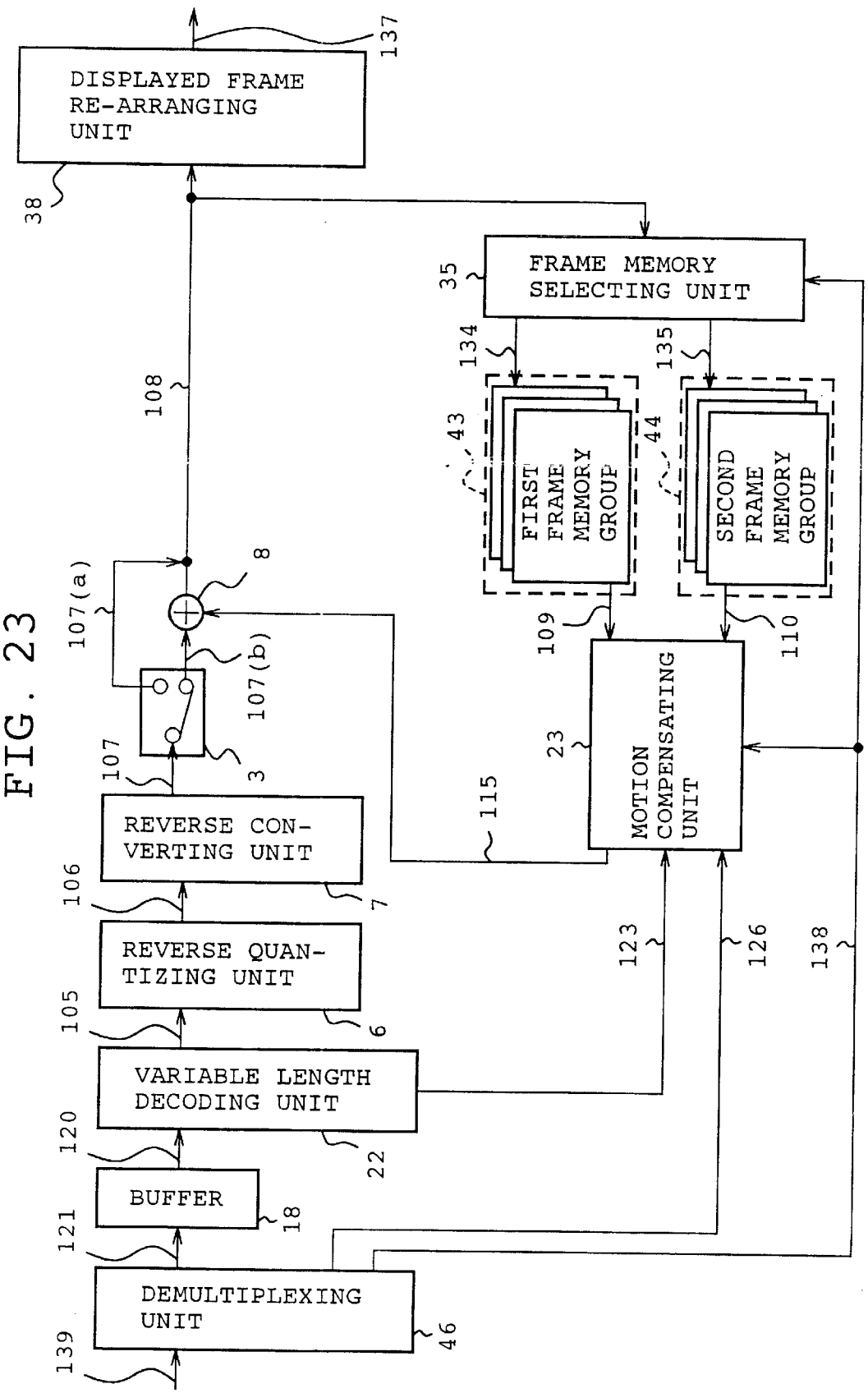
FIG. 23 is a block diagram of a decoding apparatus according to an embodiment 11 of the present invention.

A block diagram of an image decoding apparatus which corresponds to the image coding apparatus of the embodiment 10 shown in FIG. 22 is shown in FIG. 23. Referring to FIG. 23, reference numeral 46 denotes a demultiplexing unit, 43 a first frame memory group, 44 a second frame memory group, and 138 an object identification signal. The other components are similar to those of the image decoding apparatus of, for example, the embodiment 4 shown in FIG. 13, and accordingly, repetitive description of them is omitted here.

Operation will be described subsequently.

In response to an object identification signal 138 demultiplexed by the demultiplexing unit 46, the motion compensating unit 23 reads out a reference image from one of frame memories of a predetermined frame memory group which corresponds to a predetermined object, and performs motion compensation corresponding to a prediction mode to generate a predicted image 115.

In the meantime, the frame memory selecting unit 35 writes a decoded image 108 into one of the frame memories of a predetermined frame memory group which corresponds to a predetermined object in accordance with the object identification signal 138. The other processing is similar to that of the image decoding apparatus of the embodiment 4 shown in FIG. 13, and accordingly, repetitive description of it is omitted here.

Embodiment 12

Figure 24:
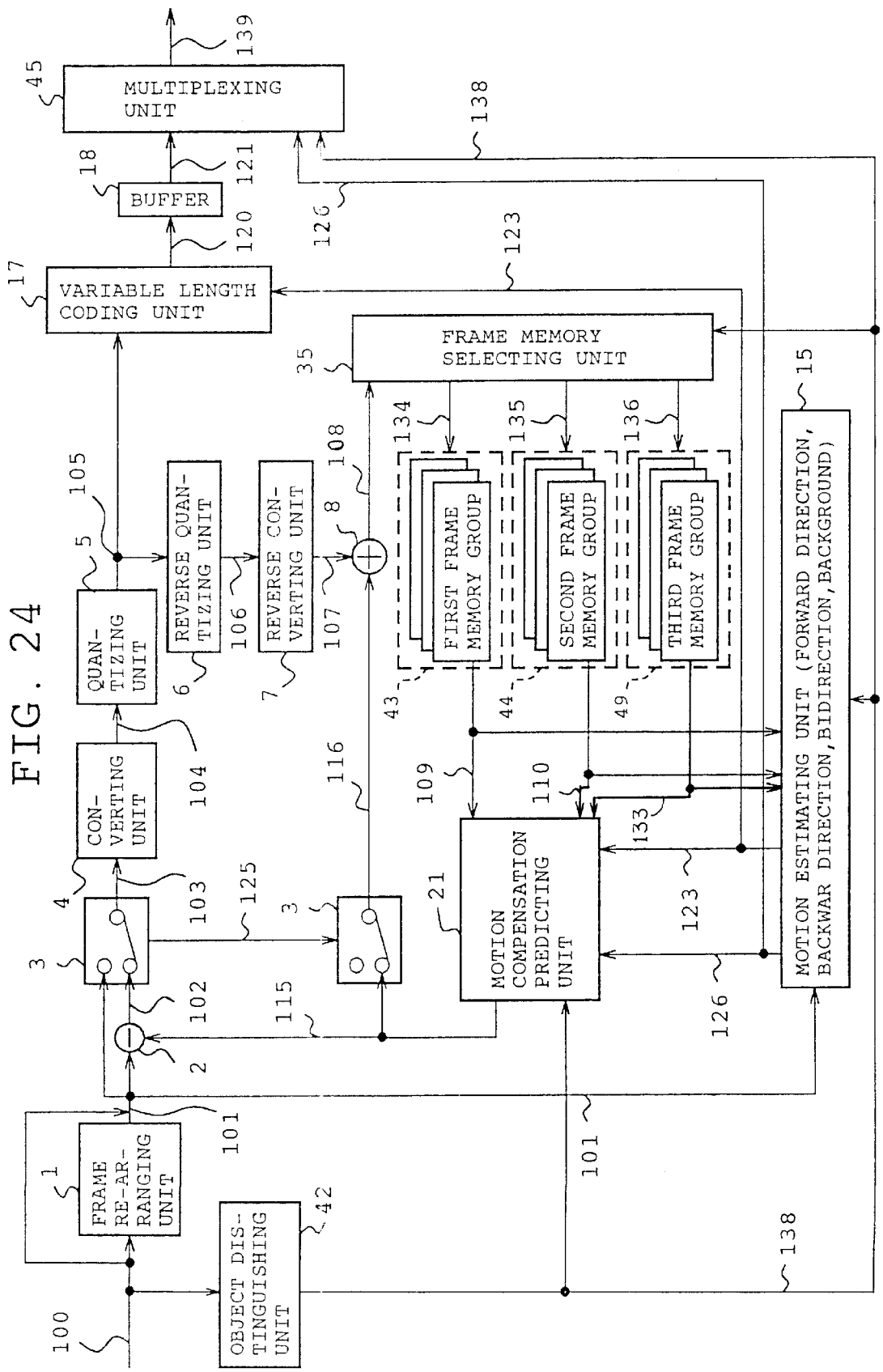
FIG. 24 is a block diagram of a coding apparatus according to embodiments 12 and 15 of the present invention.

FIG. 24 is a block diagram of an image coding apparatus which includes a further frame memory group in addition to the construction of the embodiment 10 described hereinabove with reference to FIG. 22 such that it may include totaling three frame memory groups. Referring to FIG. 24, reference numeral 49 denotes a third frame memory group. The other components are similar to those of the image coding apparatus of the embodiment 10 shown in FIG. 22, and accordingly, repetitive description of them is omitted here.

Subsequently, operation will be described.

An input image 100 includes identification signals applied to individual objects in advance, and the identification signals are identified by the object distinguishing unit 42. The number of each of the thus identified objects is outputted as an object identification signal 138 from the object distinguishing unit 42.

The motion estimating unit 15 selects, from among the first frame memory group 43, the second frame memory group 44 and the third frame memory group 49, a frame memory which corresponds to the object of the subject of coding in accordance with the object identification signal 138, reads out a reference image from the selected frame memory and performs motion prediction.

Meanwhile, the motion compensation predicting unit 21 selects a frame memory corresponding to a predetermined object in accordance with a motion prediction mode 126 determined by the motion estimating unit 15 and generates a predicted image 115.

On the other hand, the frame memory selecting unit 35 writes a decoded image 108 into one of the frame memories of a predetermined one of the frame memory groups which corresponds to a predetermined object in accordance with the object identification signal 138. Further, the object identification signal 138 is multiplexed together with other coding information by the multiplexing unit 45 and sent out as a multiplexed bit stream 139.

While, in the image coding apparatus of the present embodiment 12, the first, second and third memory groups are provided to realize the construction for switching of motion compensating prediction, for implementation of the hardware, a plurality of frame memories can be provided at a time by cutting a memory having a storage capacity for the plurality of frame memories based on internal addresses.
Embodiment 13

Figure 25:
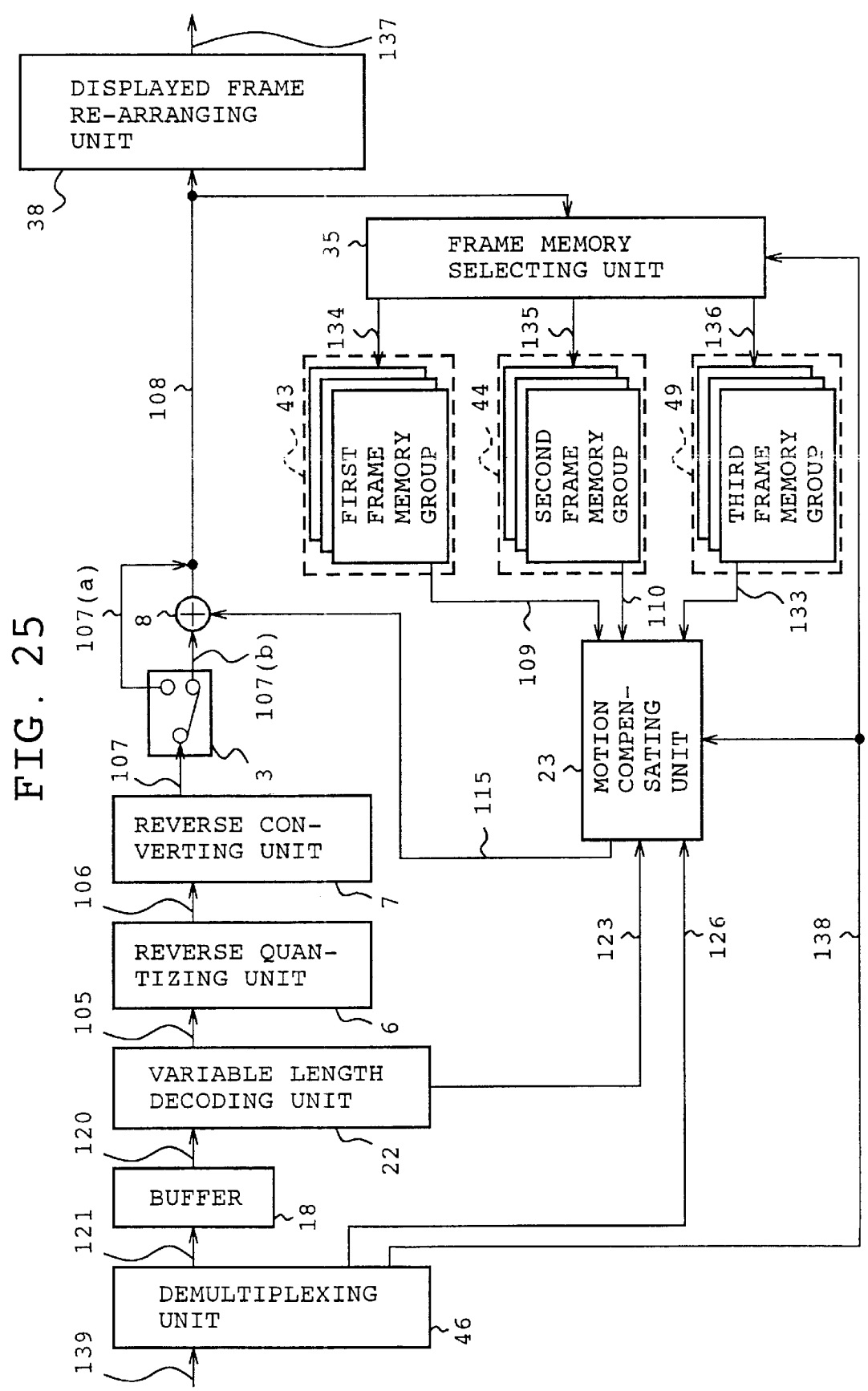
FIG. 25 is a block diagram of a decoding apparatus according to an embodiment 13 of the present invention.

A block diagram of an image decoding apparatus corresponding to the image coding apparatus of the embodiment 12 shown in FIG. 24 is shown in FIG. 25. Referring to FIG. 25, reference numeral 49 denotes a third frame memory group. The other components are similar to those of the image decoding apparatus of, for example, the embodiment 11 shown in FIG. 23, and accordingly, repetitive description of them is omitted here.

Operation will be described subsequently.

In response to an object identification signal 138 demultiplexed by the demultiplexing unit 46, the motion compensating unit 23 reads out a reference image from one of frame memories of a predetermined frame memory group which corresponds to a predetermined object, and performs motion compensation corresponding to a prediction mode to generate a predicted image 115.

In the meantime, the frame memory selecting unit 35 writes a decoded image 108 into one of the frame memories of a predetermined frame memory group which corresponds to a predetermined object in accordance with the object identification signal 138.

The other processing is similar to that of the image decoding apparatus of the embodiment 11 shown in FIG. 23, and accordingly, repetitive description of it is omitted here.

Embodiment 14

The image coding apparatus such as embodiment 12 shown in FIG. 24 may be modified such that re-writing of image contents of a region, in which an object of a subject of coding is included, of a frame memory corresponding to the object in the second frame memory in which a decoded image of the object in the past is stored is performed after each certain interval of time or in response to a control signal from the outside.

Figure 26:
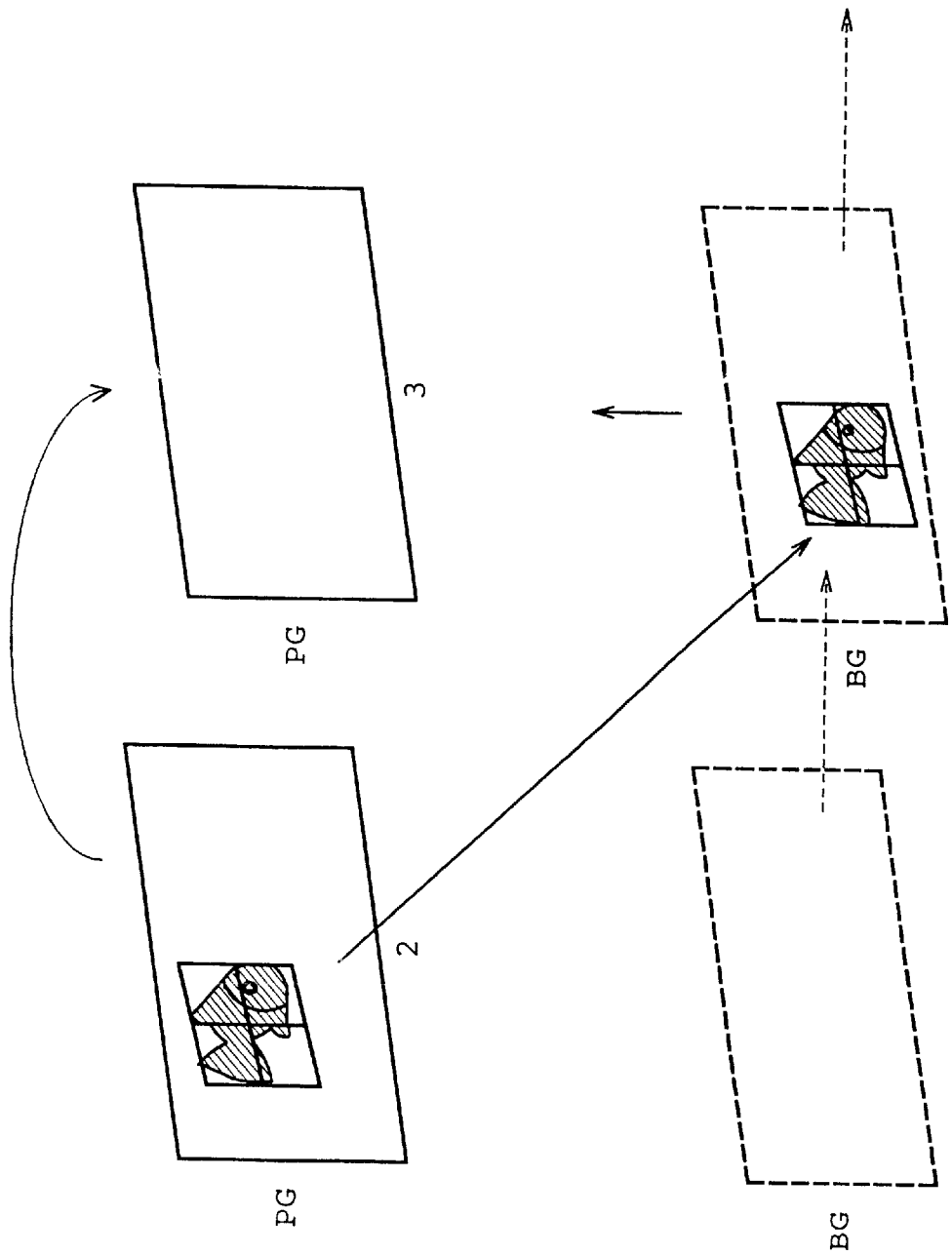
FIG. 26 is a diagrammatic view illustrating re-writing of an image in an object region performed in a coding apparatus according to an embodiment 14 of the present invention.

FIG. 26 is a diagrammatic view illustrating that, for example, with a decoded image of all macroblocks including a region occupied by a certain object, image contents in a macroblock or macroblocks at the same position of a frame memory in the second frame memory group which corresponds to the object are re-written. Accordingly, in the case of FIG. 26, contents of totaling four macroblocks in two vertical columns and two horizontal rows are updated.

Further, where re-writing of image contents of a region, in which an object of a subject of coding is included, of a frame memory corresponding to the object in the third frame memory in which a decoded image of the object in the past is stored is performed after each certain interval of time or in response to a control signal from the outside, the writing operation into a frame memory in the second frame memory group in the foregoing description should be applied to the writing operation into a frame memory in the third frame memory group.

Also with a decoding apparatus which corresponds to the image coding apparatus such as embodiment 12 shown in FIG. 24 as described above, re-writing of image contents of a region, in which an object is included, of a frame memory corresponding to the object in the second frame memory group in which a decoded image of the object in the past is stored can be controllably performed after a certain interval of time or in response to a control signal from the outside.
Embodiment 15

The image coding apparatus of the embodiment 10 shown in FIG. 22 can be modified such that searching ranges of motion vector searching for a reference image from a frame memory of the first frame memory group which corresponds to an object and another reference image from another frame memory of the second frame memory group which corresponds to another object are varied for the individual objects.

For example, in the image coding apparatus of the embodiment 10 shown in FIG. 22, if a background which exhibits a comparatively small amount of motion as an object is stored in advance in a frame memory of the second frame memory group which corresponds to the object whereas an operation of successively writing a decoded image of another object which exhibits a comparatively large amount of motion at any time into another frame memory of the first frame memory group which corresponds to the object is performed, then a high prediction efficiency can be maintained for both of the objects.

Further, the image coding apparatus of the embodiment 12 shown in FIG. 24 may be modified such that searching ranges of motion vector searching for a reference image from s from memory of the first frame memory group which corresponds to an object, another reference image from another frame memory of the second frame memory group which corresponds to another object and a further reference image from a further frame memory of the third frame memory group which corresponds to a further object are varied for the individual objects.

For example, in the image coding apparatus of the embodiment 12 shown in FIG. 24, if a background which exhibits a comparatively small amount of motion as an object is stored in advance in a frame memory of the third frame memory group which corresponds to the object whereas an operation of successively writing a decoded image of another object which exhibits a comparatively large amount of motion at any time into another frame memory of the first frame memory group or the second frame memory group which corresponds to the object is performed, then a high prediction efficiency can be maintained for all of the three objects.

As described above, since searching ranges for a motion vector are set separately from each other for a plurality of frame memory groups referred to by objects. for example, for an object which exhibits a comparatively small amount of motion, the information generation amount of motion vectors can be reduced by making the searching range for a motion vector narrow.

Embodiment 16

Figure 27:
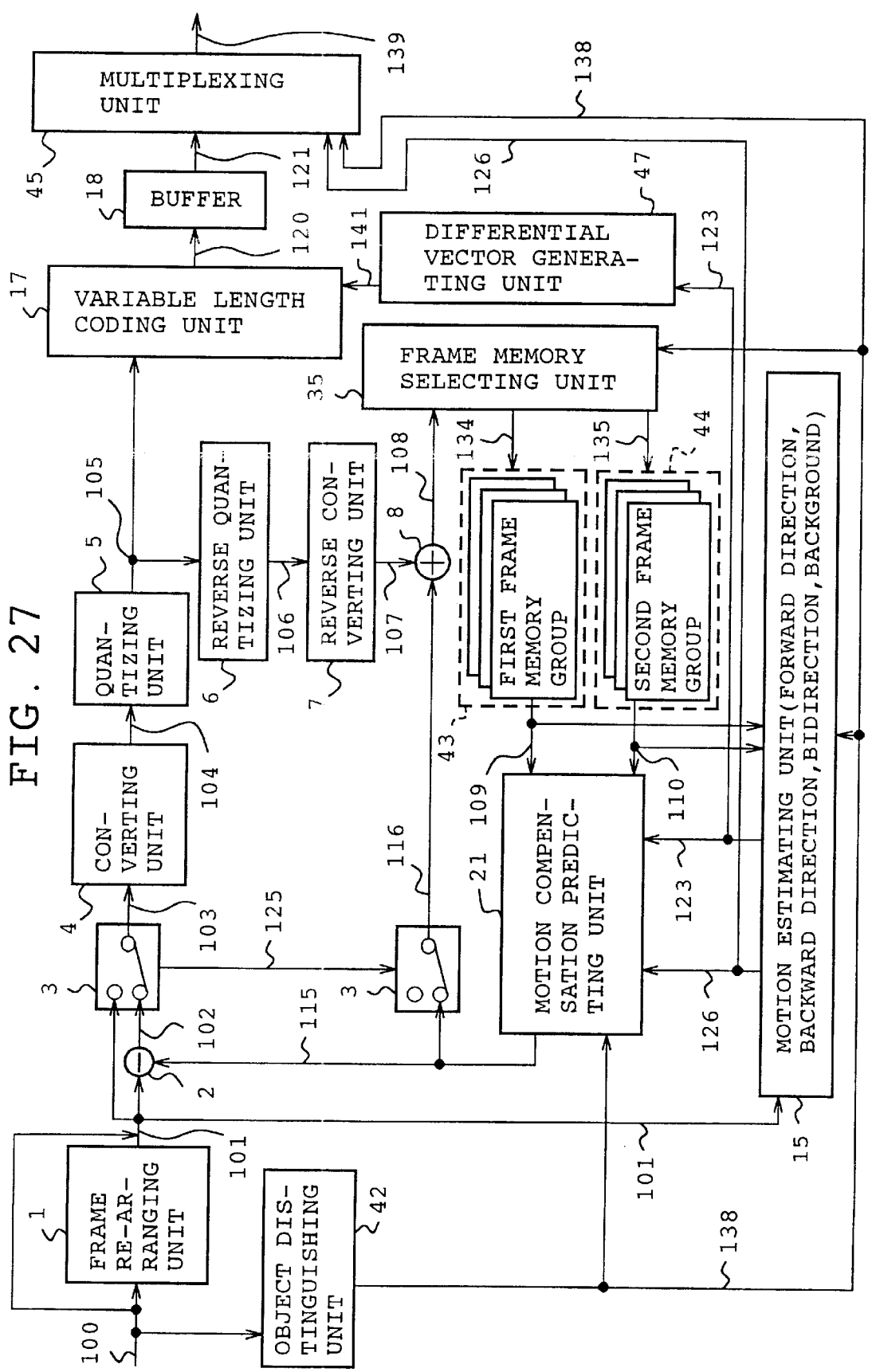
FIG. 27 is a diagrammatic view of a coding apparatus according to an embodiment 16 of the present invention.

FIG. 27 is a block diagram showing an image coding apparatus according to an embodiment 16 of the present invention. Referring to FIG. 27, reference 47 denotes a differential vector generating unit. The differential vector generating unit 47 holds motion vectors in the past obtained by referring to images of individual objects from frame memories of the first frame memory group which correspond to the objects and motion vectors in the past obtained by referring to images of the individual objects from frame memories of the second frame memory group which correspond to the objects in the image coding apparatus of the embodiment 10 shown in FIG. 22 separately for certain periods of time and calculates difference vectors separately for the individual objects. The other construction is similar to that of the image coding apparatus of the embodiment 10 shown in FIG. 22, and accordingly, repetitive description of it is omitted here.

Subsequently, operation will be described.

The motion estimating unit 15 performs motion estimation of a current image 101 of an object of a subject of coding using an image in a frame memory corresponding to the object in one of the first frame memory group and the second frame memory group selected by motion estimation as a reference image to detect a motion vector 123.

Based on the motion vector 123, the differential vector generating unit 47 selects a candidate vector (MV1, MV2 or MV3 mentioned hereinabove) from among motion vectors of the object in the past stored in the differential vector generating unit 47 and outputs a difference vector 141 of the candidate vector from the motion vector 123. The difference vector 141 is coded into a variable length codeword by the variable length coding unit 17. Accordingly, the differential vector generating unit 47 has a memory function of holding motion vectors in the past separately for certain periods of time for the individual frame memory groups.

Embodiment 17

Figure 28:
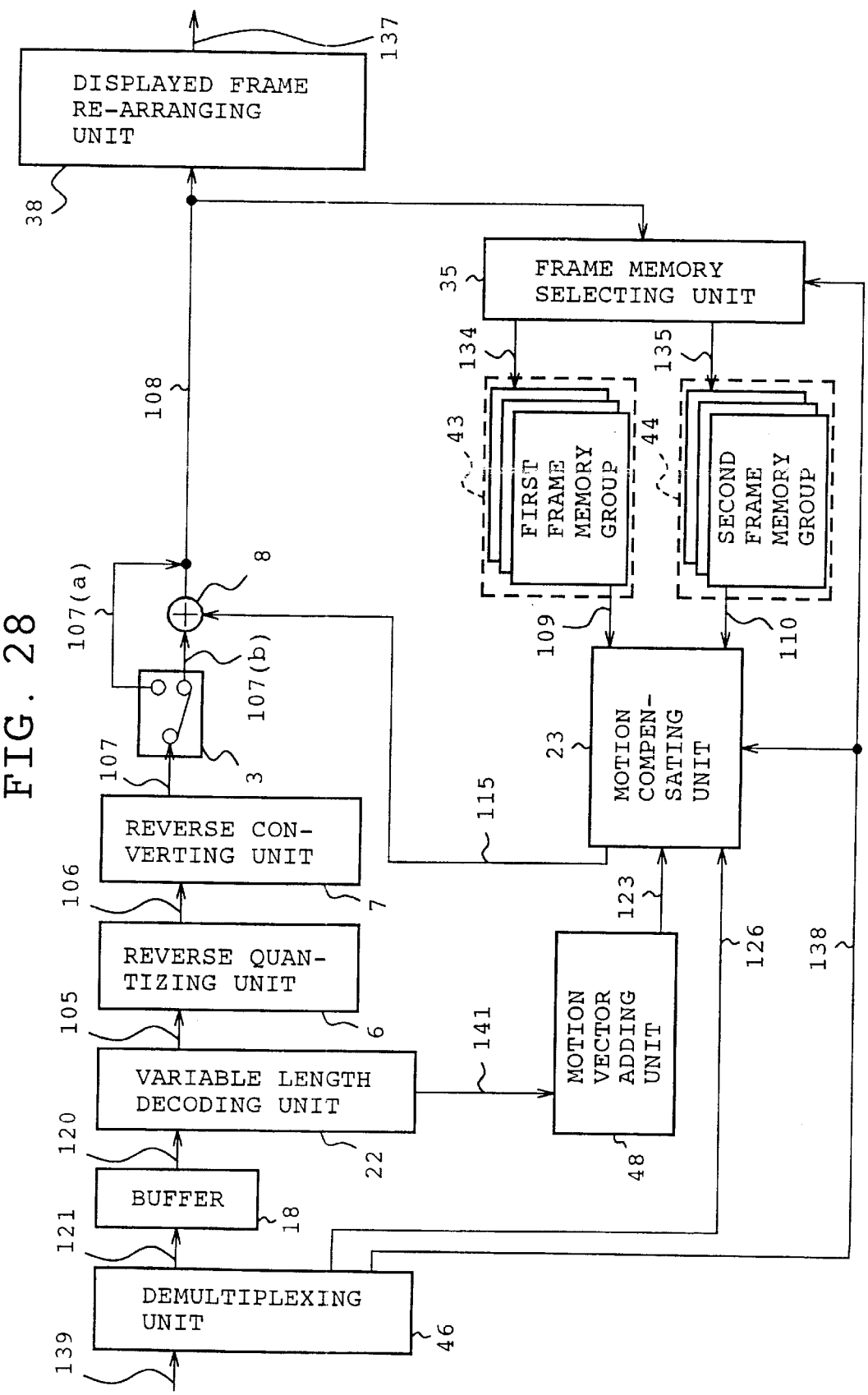
FIG. 28 is a diagrammatic view of a decoding apparatus according to an embodiment 17 of the present invention.

A block diagram of a decoding apparatus corresponding to the image coding apparatus of the embodiment 16 shown in FIG. 27 is shown in FIG. 28. Referring to FIG. 28, reference numeral 48 denotes a motion vector adding unit which selects a candidate vector from among motion vectors of an object in the past stored in advance therein and adds the selected candidate vector to a difference vector 141 variable length decoded by the variable length decoding unit 22. The other construction is similar to that of the image decoding apparatus of the embodiment 11 shown in FIG. 22, and accordingly, repetitive description of it is omitted here.

Subsequently, operation will be described.

In the image decoding apparatus of the present embodiment 17, a difference vector 141 variable length coded by the variable length decoding unit 22 is supplied to the motion vector adding unit 48, by which a candidate vector is selected from among motion vectors of an object in the past stored therein and added to the difference vector 141 to regenerate a motion vector 123.

The motion vector 123 is sent to the motion compensating unit 23. The motion compensating unit 23 receives the motion vector 123, reads out an image in the memory group 43 or 44 corresponding to the object in the frame memory group selected by the frame memory selecting unit 35 as a reference image, and outputs a predicted image 115. The other processing is similar to the operation of the image decoding apparatus of the embodiment 11 shown in FIG. 23, and accordingly, repetitive description of it is omitted here.

Embodiment 18

Figure 29:
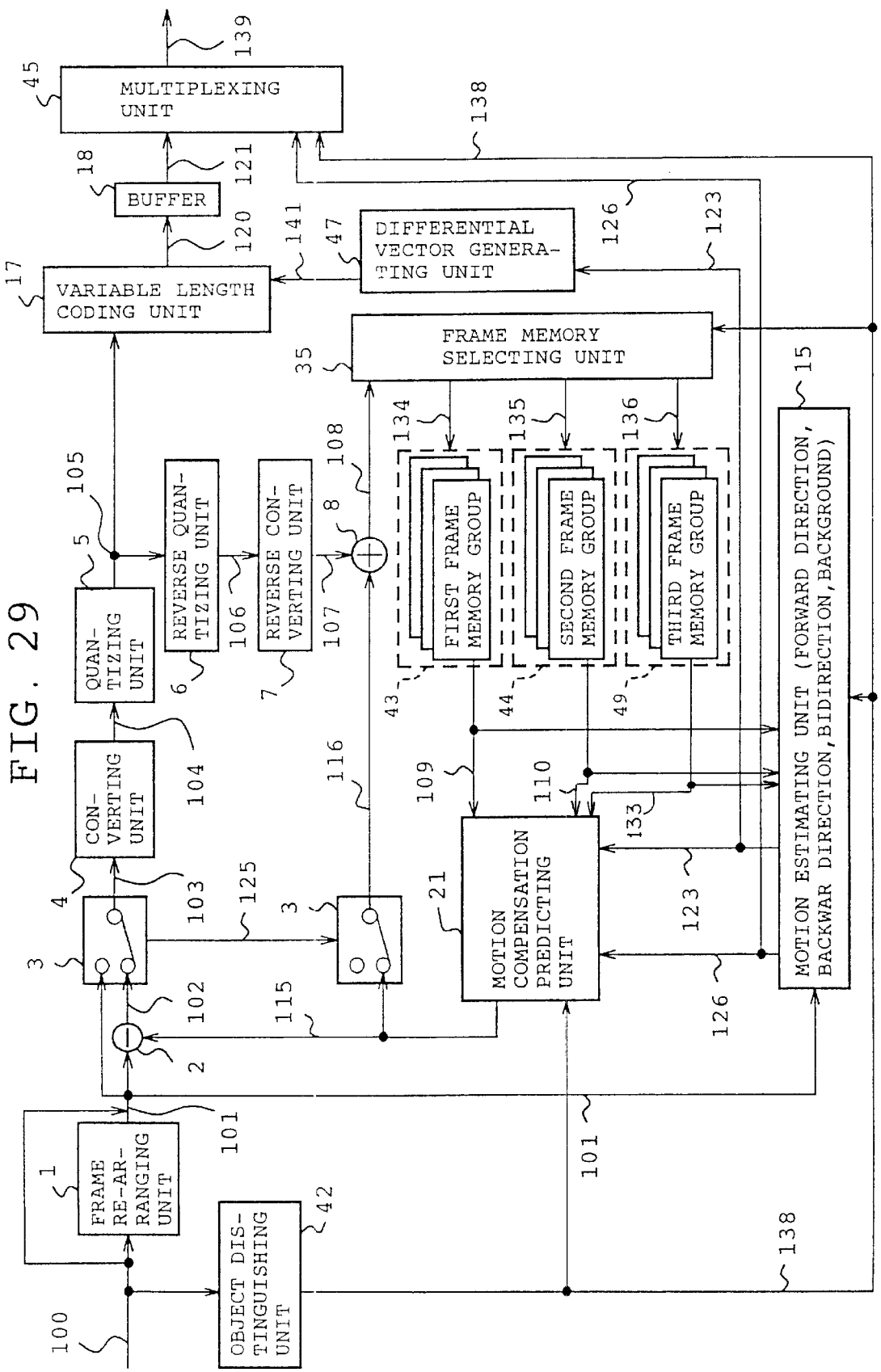
FIG. 29 is a diagrammatic view of a coding apparatus according to an embodiment 18 of the present invention.

A construction of an image coding apparatus which includes a third frame memory group 49 in addition to the construction of the image coding apparatus of the embodiment 16 shown in FIG. 27 is shown in FIG. 29. The other construction is similar to that of the image coding apparatus of the embodiment 16 shown in FIG. 27, and accordingly, repetitive description of it is omitted here.

Subsequently, operation will be described.

The motion estimating unit 15 performs motion estimation of a current image 101 of an object of a subject of coding using an image in a frame memory corresponding to the object in one of the first frame memory group, the second frame memory group and the third frame memory group selected by motion estimation as a reference image to detect a motion vector 123.

Based on the motion vector 123, the differential vector generating unit 47 selects a candidate vector (MV1, MV2 or MV3 mentioned hereinabove) from among motion vectors of the object in the past stored in the differential vector generating unit 47 and outputs a difference vector 141 of the candidate vector from the motion vector 123. The difference vector 141 is coded into a variable length codeword by the variable length coding unit 17.

Also in this instance, the differential vector generating unit 47 has a memory function of holding motion vectors in the past separately for certain periods of time for the individual frame memory groups. Since the other processing is similar to the operation of the image coding apparatus of the embodiment 16 shown in FIG. 27, repetitive description of it is omitted herein.

Embodiment 19

Figure 30:
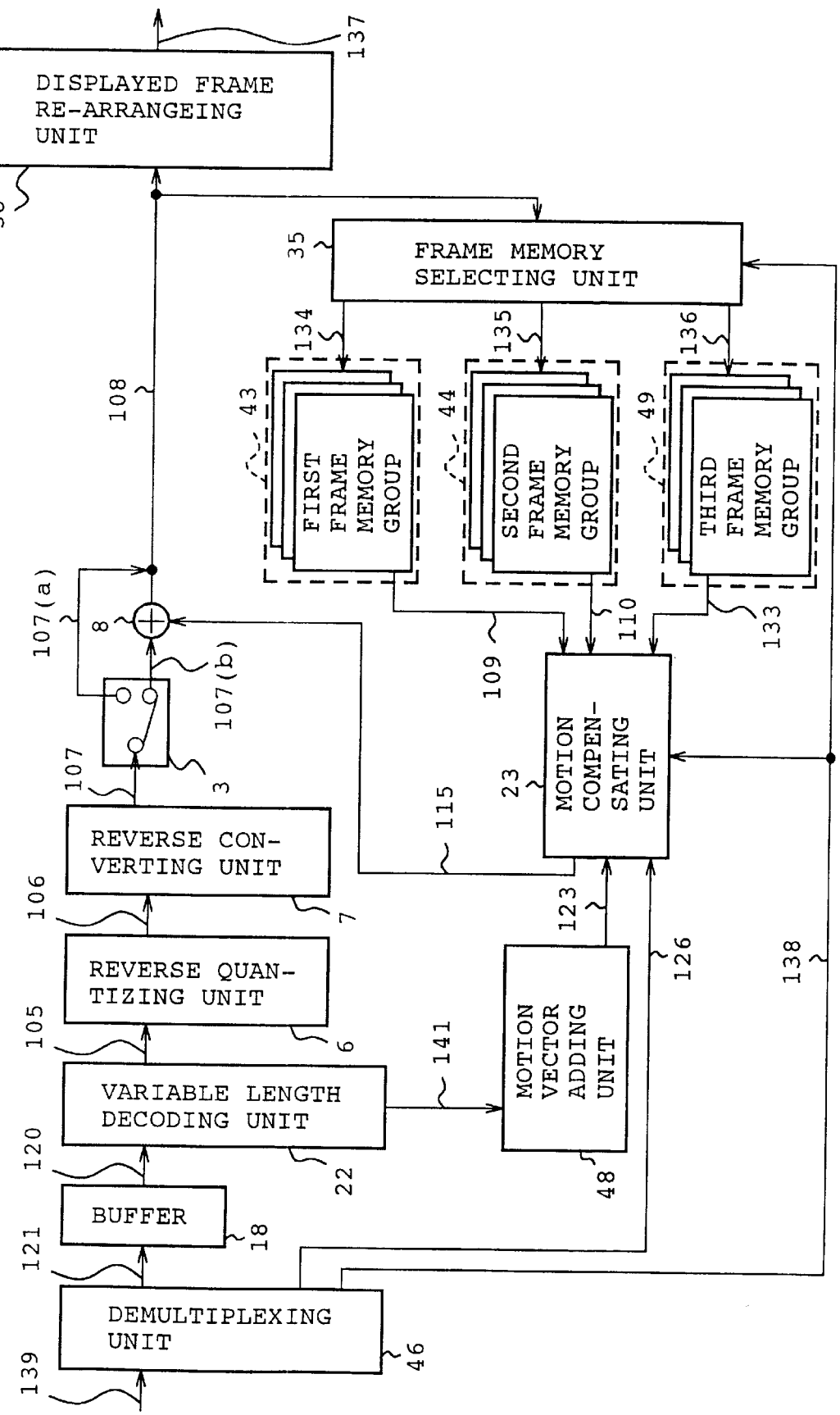
FIG. 30 is a diagrammatic view of a decoding apparatus according to an embodiment 19 of the present invention.

A construction of an image decoding apparatus corresponding to the image coding apparatus of the embodiment 18 shown in FIG. 29 is shown in FIG. 30. Referring to FIG. 30, reference numeral 49 denotes a third frame memory group. Since the other construction is similar to that of the image decoding apparatus of the embodiment 17 shown in FIG. 28, repetitive description of it is omitted here.

Subsequently, operation will be described.

A difference vector 141 variable length coded by the variable length decoding unit 22 is supplied to the motion vector adding unit 48, by which a candidate vector is selected from among motion vectors of an object in the past stored therein and added to the difference vector 141 to regenerate a motion vector 123. The motion vector 123 is sent to the motion compensating unit 23. The motion compensating unit 23 reads out a reference image in a frame memory corresponding to the object in the selected frame memory group, and outputs a predicted image 115.

As described above, if a differential vector generating unit which has a memory function of holding a number of motion vectors, which is equal to the number of the frame memory groups, in the past separately for certain periods of time for the individual frame memory groups and calculates a difference vector between a detected motion vector and a candidate vector is provided, then the information generation amount of motion vectors can be suppressed.

As described above, with the image coding apparatus of the present invention, since a background image is stored and motion compensating prediction is performed using background prediction based on the stored background image, there is an effect that coding can be performed while keeping a high prediction efficiency without being influenced by a coding sequence.

Further, with the image coding apparatus and the image decoding apparatus of the present invention, since re-writing of image contents in the individual frame memories is performed in units of a picture after a certain interval of time or in response to a control signal from the outside, there is another effect that the image contents of the frame memories can always be kept to contents with which a high prediction efficiency in background prediction can be obtained.

Further, with the image coding apparatus and the image decoding apparatus of the present invention, since re-writing of the image contents of the individual frame memories is performed in units of a macroblock after a certain interval of time or in response to a control signal from the outside, there is a further effect that the image contents of the frame memories can always be kept to contents with which a high prediction efficiency in background prediction can be obtained with a finer level.

Further, with the image coding apparatus and the image decoding apparatus of the present invention, since the searching ranges for a motion vector to be used for motion estimation are variably set for the plurality of frame memories provided in the coding apparatus, for example, when motion is to be searched for from reference to a frame memory in which a screen which involves a comparatively small amount of motion is written, a comparatively short code can be given, and accordingly, there is a still further effect that the coding information amount of motion vectors can be reduced.

Further, with the image coding apparatus and the image decoding apparatus of the present invention, since the differential vector generating unit which has a memory function of holding a number of motion vectors, which is equal to the number of the frame memories, in the past separately for a certain period of time and calculates a difference vector between a detected motion vector and a candidate vector is provided, there is a yet further effect that the information generation amount of motion vectors can be suppressed.

Further, with the image coding apparatus and the image decoding apparatus of the present invention, since motion compensating prediction is performed using the plurality of frame memories for the individual objects which construct a screen, a prediction structure conforming to motion of the objects can be taken, and consequently, there is a yet further effect that the overall prediction efficiency is improved.

Further, with the image coding apparatus and the image decoding apparatus of the present invention, since only regions of the frame memories in the frame memory groups in which an object of a subject of coding is included are re-written after a certain interval of time or in response to an external control signal, there is a yet further effect that a high efficiency in background prediction can be maintained.

Further, with the image coding apparatus and the image decoding apparatus of the present invention, since the searching ranges for a motion vector are set separately for the plurality of frame memory groups referred to by an object, there is a yet further effect that, for example, for an object which exhibits a comparatively small amount of motion, the information generation amount of motion vectors can be reduced by making the searching range for a motion vector narrow.

Furthermore, with the image coding apparatus and the image decoding apparatus of the present invention, since the differential vector generating unit which has a memory function of holding a number of motion vectors, which is equal to the number of the frame memory groups, in the past separately for certain periods of time for the individual frame memory groups and calculates a difference vector between a detected motion vector and a candidate vector is provided, there is an additional effect that the information generation amount of motion vectors can be suppressed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image coding apparatus, comprising:

frame memories for storing a plurality of decoded images;

motion compensating prediction means for performing motion compensating prediction corresponding to an input image based on the plurality of decoded images stored in said frame memories to produce a motion vector and for generating a predicted image based on the motion compensating prediction;

prediction error calculation means for calculating a difference between the predicted image generated by said motion compensating prediction means and the input image to calculate a prediction error image;

decoding means for generating the decoded images from the prediction error image calculated by said prediction error calculation means and the predicted image;

image storage controller for determining and outputting the coding mode of the image to be predicted according to an input control signal, and allocating the type of the reference image to be stored in one of said frame memories to continuously decoded image or the stationary background image based on the selected coding mode of the image to be predicted; and background motion compensation means for performing motion compensating prediction corresponding to the input image based on the background image to generate a motion vector and generating a predicted image based on the motion compensating prediction, wherein said image storage controller performs re-writing of image contents into said frame memories in response to a given control signal.

2. An image coding apparatus according to claim 1, wherein said frame memories includes a frame memory for storing a decoded image, and another frame memory for storing the background image.

3. An image coding apparatus according to claim 1, wherein re-writing of image contents into said storage means by said background image storage control means is performed in units of a picture after a predetermined interval of time or in response to a control signal from the outside.

4. An image coding apparatus according to claim 1, wherein re-writing of image contents into said storage means by said background image storage control means is performed in units of a macroblock after a predetermined interval of time or in response to a control signal from the outside.

5. An image coding apparatus according to claim 1, wherein said background motion compensation means has a variable searching range for a motion vector from the background images.

6. An image coding apparatus according to claim 1, further comprising differential vector generation means for holding a motion vector obtained from said motion compensation means or said background motion compensation means and calculating a difference vector between the generated motion vector and the motion vector in the past, and the difference vector is variable length coded.

7. An image coding apparatus according to claim 1, wherein said background image storage control means performs re-writing of image contents into said storage means per unit of a picture after a predetermined time-interval.

8. An image coding apparatus according to claim 1, wherein said background image storage control means performs re-writing of image contents into said storage means per unit of a macro-block after a predetermined time-interval.

9. An image coding apparatus according to claim 1, wherein said background image storage control means performs re-writing of image contents into said storage means per unit of a picture in response to an outside control signal.

10. An image coding apparatus according to claim 1, wherein said background image storage control means performs re-writing of image contents into said storage means per unit of a macro-block in response to an outside control signal.

11. An image decoding apparatus, comprising:
frame memories for storing a plurality of decoded images;
motion compensation means for performing motion compensating prediction based on the decoded images stored in said frame memories to generate a motion compensated image;
decoding means for generating coded images from the motion compensated image from said motion compensation means and a prediction error image;
an image storage controller for allocating the type of the reference image to be stored in one of said frame memories to continuously decoded image or the stationary background image based on the coding mode of the image to be decoded, which is extracted from encoded bitstream; and
background predicted image generation means for generating a background predicted image based on the background image, wherein said image storage controller performs re-writing of image contents into said frame memories in response to a given control signal.

12. An image decoding apparatus according to claim 11, wherein said frame memories includes a frame memory for storing a decoded image, and another frame memory for storing the background image.

13. An image decoding apparatus according to claim 11, wherein re-writing of image contents into said storage means by said background image storage control means is performed in units of a picture after a predetermined interval of time or in response to a control signal from the outside.

14. An image decoding apparatus according to claim 11, wherein re-writing of image contents into said storage means by said background image storage control means is performed in units of a macroblock after a predetermined interval of time or in response to a control signal from the outside.

15. An image decoding apparatus according to claim 11, further comprising a motion vector adding unit for holding a motion vector decoded in the past and adding the motion vector decoded in the past to a difference vector to regenerate a motion vector.

16. An image coding apparatus according to claim 11, wherein said background image storage control means performs re-writing of image contents into said storage means per unit of a picture after a predetermined time-interval.

17. An image coding apparatus according to claim 11, wherein said background image storage control means performs re-writing of image contents into said storage means per unit of a macro-block after a predetermined time-interval.

18. An image coding apparatus according to claim 11, wherein said background image storage control means performs re-writing of image contents into said storage means per unit of a picture in response to an outside control signal.

19. An image coding apparatus according to claim 11, wherein said background image storage control means performs re-writing of image contents into said storage means per unit of a macro-block in response to an outside control signal.

20. An image coding/decoding apparatus, comprising:
an image coding apparatus, including,
image coding frame memories for storing a plurality of decoded images;
image coding motion compensating prediction means for performing motion compensating prediction corresponding to an input image based on the plurality of decoded images stored in said image coding frame memories to produce a motion vector and for generating a predicted image based on the motion compensating prediction;
image coding prediction error calculation means for calculating a difference between the predicted image generated by said image coding motion compensating prediction means and the input image to calculate a prediction error image;
first decoding means for generating the decoded images from the prediction error image calculated by said image coding prediction error calculation means and the predicted image;
an image coding image storage controller for determining and outputting the coding mode of the image to be predicted according to an input control signal, and allocating the type of the reference image to be stored in one of said image coding frame memories to continuously decoded image or the stationary background image based on the selected coding mode of the image to be predicted; and
image coding background motion compensation means for performing motion compensating prediction corresponding to the input image based on the background image to generate a motion vector and generating a predicted image based on the motion compensating prediction; and
an image decoding apparatus, including,
image decoding frame memories for storing a plurality of decoded images;
image decoding motion compensation means for performing motion compensating prediction based on the decoded images stored in said image decoding frame memories to generate a motion compensated image;
second decoding means for generating coded images from the motion compensated image from said image decoding motion compensation means and a prediction error image;

an image decoding image storage controller for allocating the type of the reference image to be stored in one of said image decoding frame memories to continuously decoded image or the stationary background image based on the coding mode of the image to be decoded, which is extracted from encoded bitstream; and image decoding background predicted image generation means for generating a background predicted image based on the background image, wherein said image decoding image storage controller performs re-writing of image contents into said image decoding frame memories in response to a given control signal.

* * * * *